(12) United States Patent
Small

(10) Patent No.: US 6,777,910 B2
(45) Date of Patent: Aug. 17, 2004

(54) RECHARGEABLE BATTERY PACKS

(75) Inventor: David Small, San Jose, CA (US)

(73) Assignee: Shoot the Moon Products II, LLC, Pleasanton, CA (US)

( * ) Notice: Subject to any disclaimer, the term of this patent is extended or adjusted under 35 U.S.C. 154(b) by 0 days.

(21) Appl. No.: 10/412,509

(22) Filed: Apr. 11, 2003

(65) Prior Publication Data

US 2003/0227277 A1 Dec. 11, 2003

Related U.S. Application Data

(62) Division of application No. 09/915,463, filed on Jul. 26, 2001, now Pat. No. 6,646,414, and a division of application No. 09/591,709, filed on Jun. 9, 2000, now Pat. No. 6,326,766.

(51) Int. Cl.[7] .............................................. H01M 10/46
(52) U.S. Cl. ....................................................... 320/106
(58) Field of Search ................................ 320/106, 107, 320/110, 112, 113, 150

(56) References Cited

U.S. PATENT DOCUMENTS

| | | |
|---|---|---|
| 4,149,682 A | 3/1979 | Nakao |
| 4,382,219 A | 5/1983 | Heine et al. |
| 4,553,081 A | 11/1985 | Koenck |
| 4,902,262 A | 2/1990 | Lunsford |
| 4,943,498 A | 7/1990 | Cooper et al. |
| 5,140,138 A | 8/1992 | Tanaka |
| 5,191,275 A | 3/1993 | Singhal |
| 5,200,687 A | 4/1993 | Lindblom et al. |
| 5,225,760 A | 7/1993 | Leiserson |
| 5,227,262 A | 7/1993 | Ozer |
| 5,250,892 A | 10/1993 | Yang |
| 5,251,105 A | 10/1993 | Kobayashi et al. |
| 5,317,247 A | 5/1994 | Chong et al. |
| 5,363,031 A | 11/1994 | Miller et al. |
| 5,378,556 A | 1/1995 | Yung |
| 5,391,792 A | 2/1995 | Gardner et al. |
| 5,414,947 A | 5/1995 | Hjaltason |
| 5,437,938 A | 8/1995 | Mitsui et al. |
| 5,473,242 A | 12/1995 | McKenna |
| 5,602,454 A | 2/1997 | Arakawa et al. |
| 5,617,079 A | 4/1997 | Harrison |
| 5,626,979 A | 5/1997 | Mitsui et al. |
| 5,654,870 A | 8/1997 | Havener |
| 5,661,392 A | 8/1997 | Imazeki |
| 5,672,441 A | 9/1997 | Aoki et al. |
| 5,760,569 A | 6/1998 | Chase, Jr. |
| 5,800,940 A | 9/1998 | Bunyea et al. |
| 5,853,915 A | 12/1998 | Suto |
| D407,064 S | 3/1999 | Lebherz |
| D408,784 S | 4/1999 | Maeyama |
| 5,939,859 A | 8/1999 | Morita |
| D417,187 S | 11/1999 | Maeyama |
| D417,860 S | 12/1999 | Lau |
| D417,861 S | 12/1999 | Maeyama |
| 6,014,010 A | 1/2000 | Yao |
| 6,020,721 A | 2/2000 | Brotto |
| 6,023,146 A | 2/2000 | Casale et al. |
| 6,326,766 B1 | 12/2001 | Small |

Primary Examiner—Edward H. Tso
(74) Attorney, Agent, or Firm—Blakely, Sokoloff, Taylor & Zafman LLP

(57) ABSTRACT

Rechargeable battery packs include one or more key slots along a rear edge in order to distinguish it from other battery pack types and rectangular guide tabs to be backward compatible with former battery pack chargers and former battery operated devices. Battery pack chargers include one or more key tabs in a door and rectangular guide tabs to differentiate rechargeable battery packs that can be safely charged. Door closure switches on a safety switch to activate safe charging of a rechargeable battery pack with matching one or more key slots. The one or more key tabs and the one or more key slots provide a safety mechanism to distinguish rechargeable battery packs which can be safely charged. Rectangular guide tabs on sidewalls of an inner housing allow rectangular guide tabs of the rechargeable battery packs to slide under and further differentiates those that can be safely charged.

55 Claims, 13 Drawing Sheets

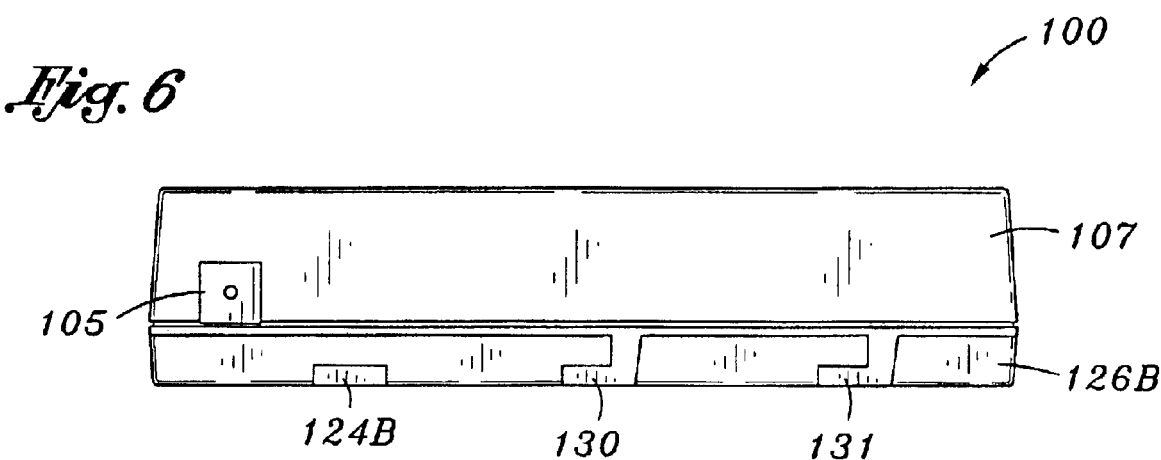
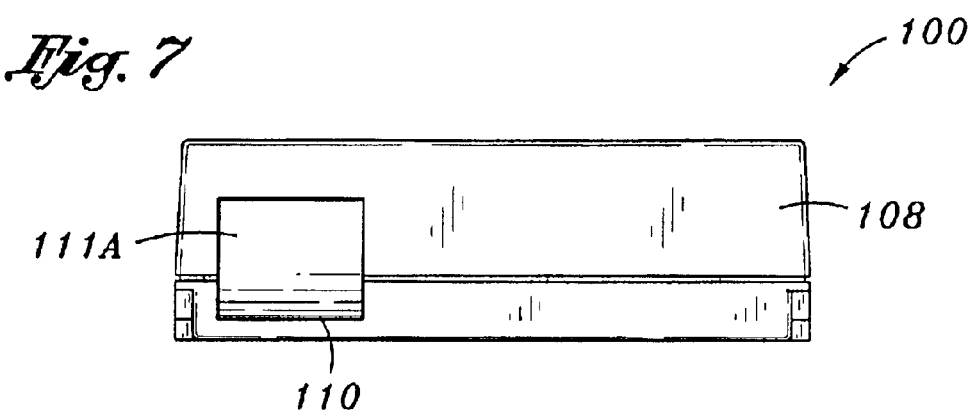
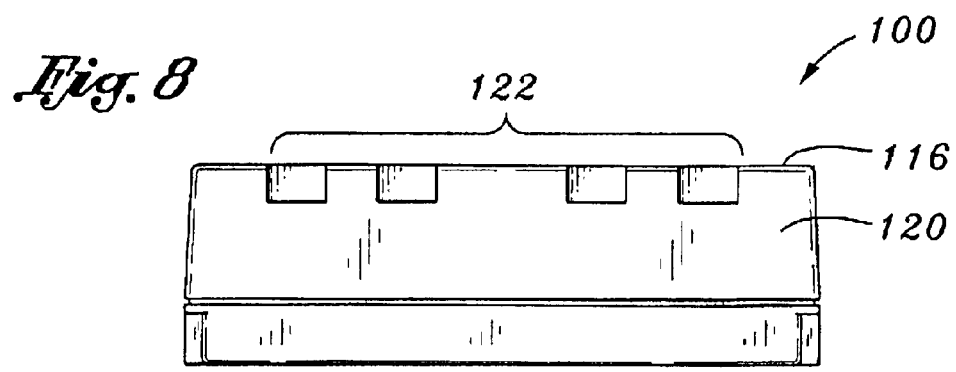

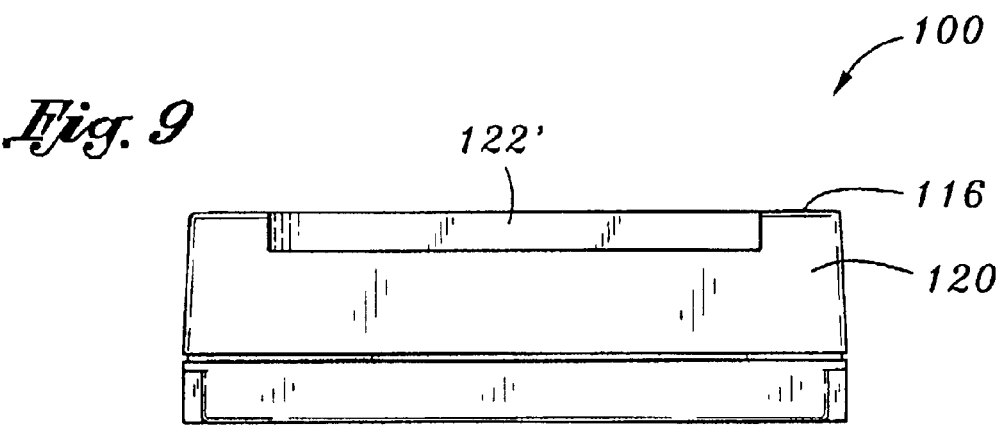
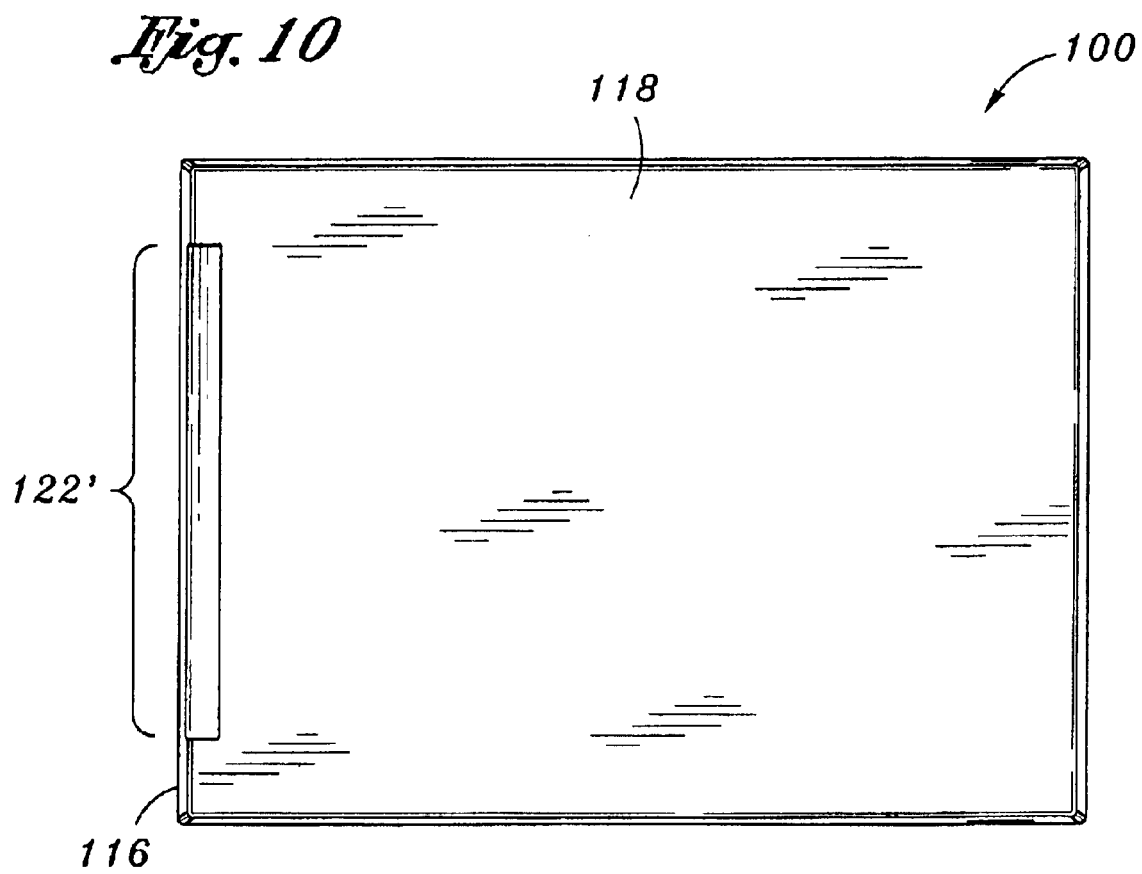

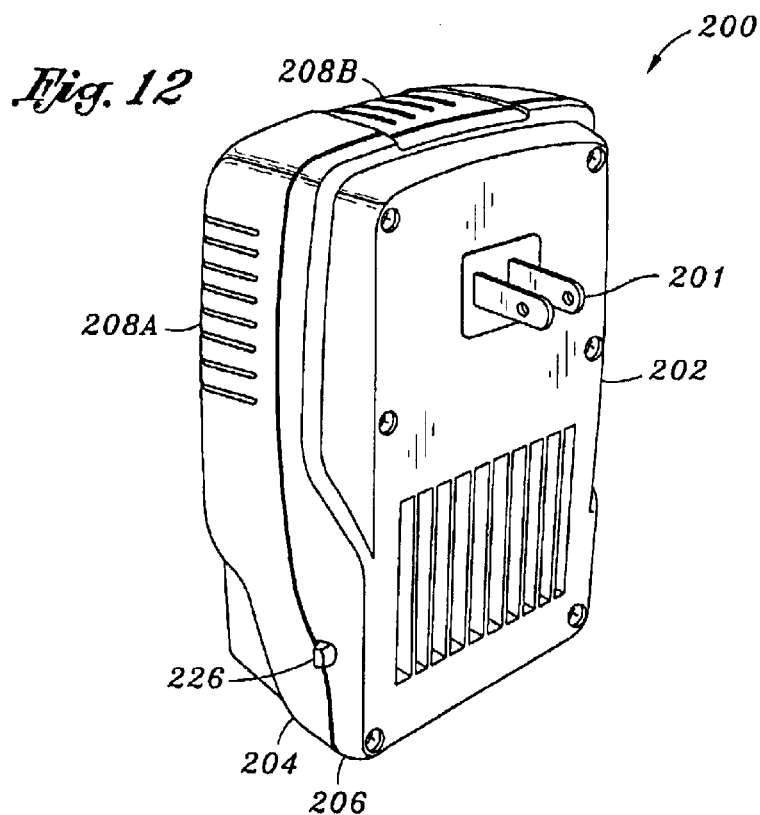
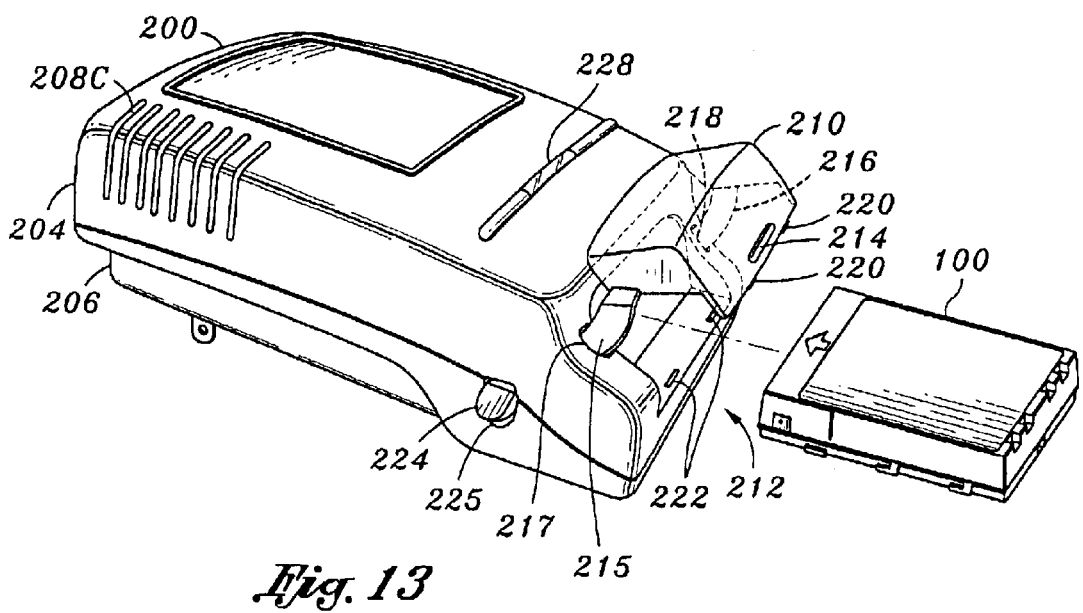

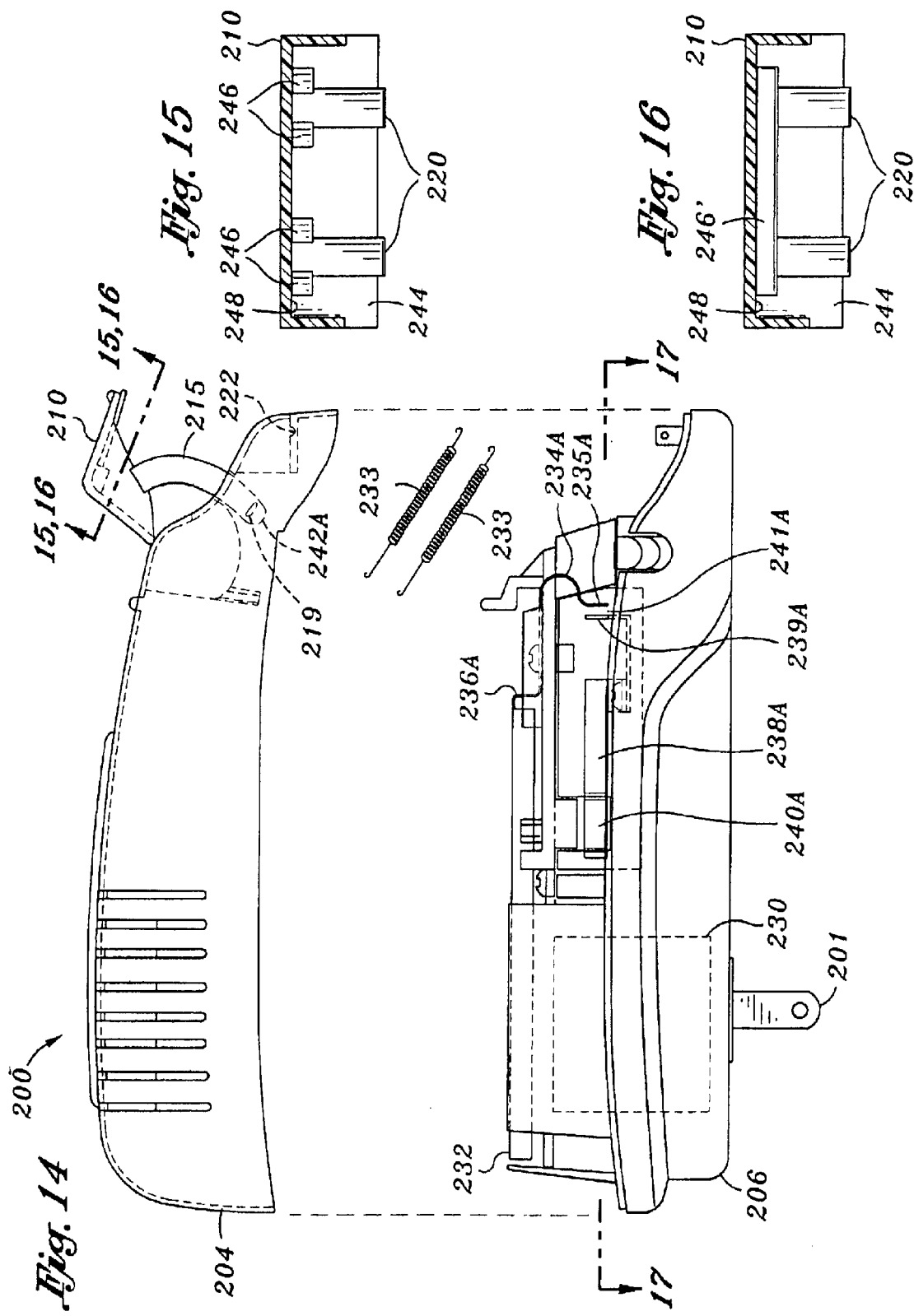

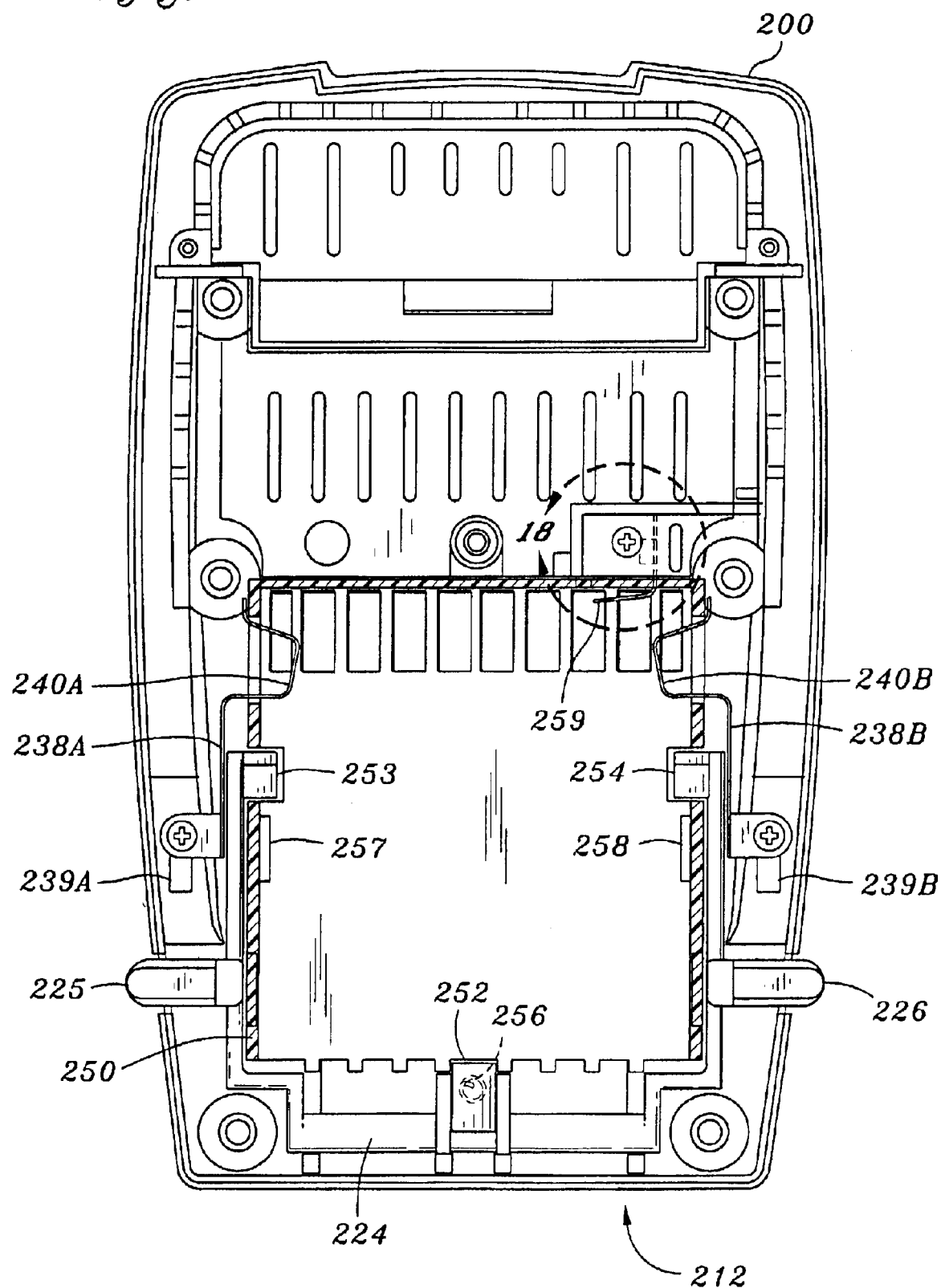

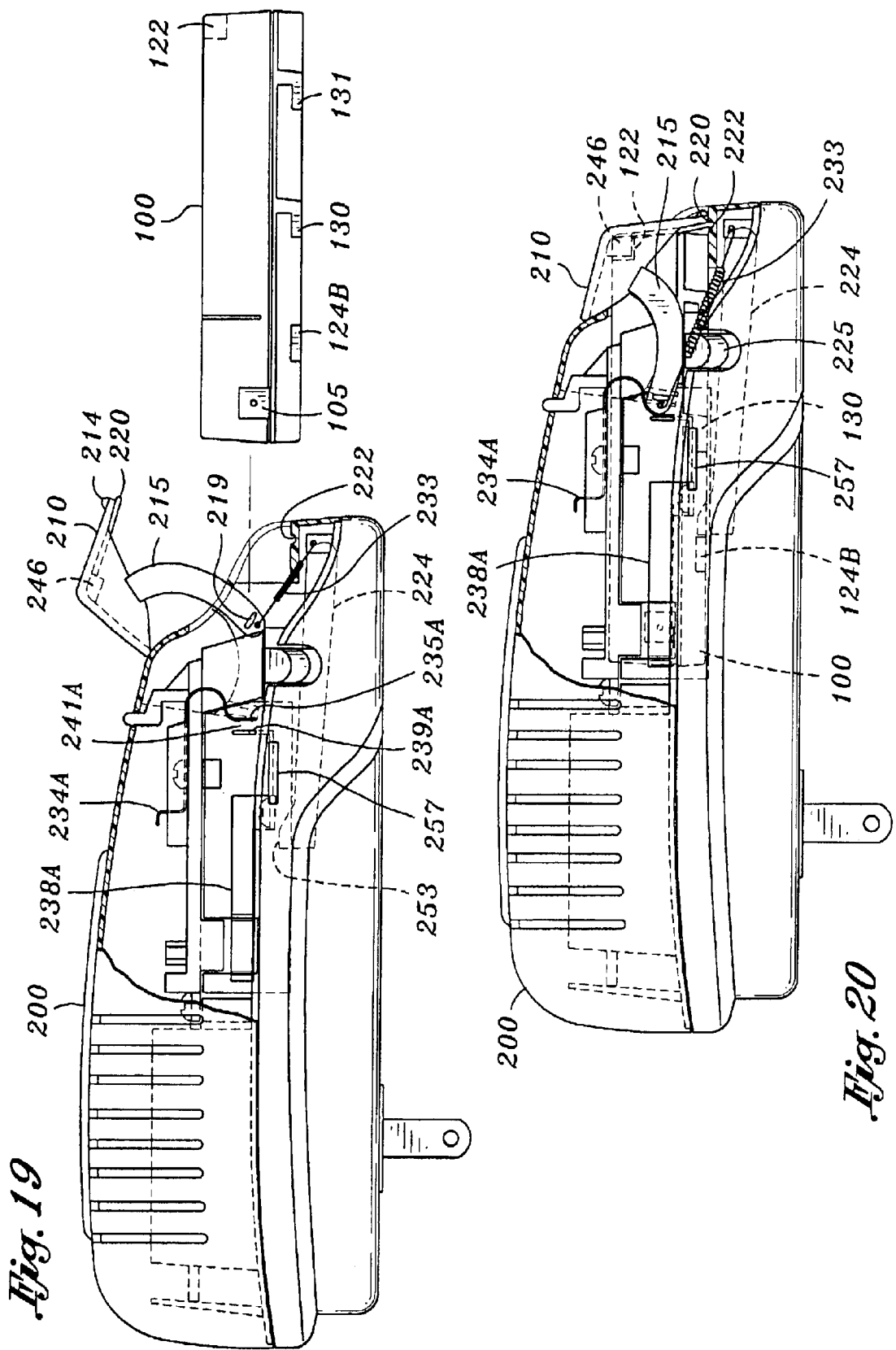

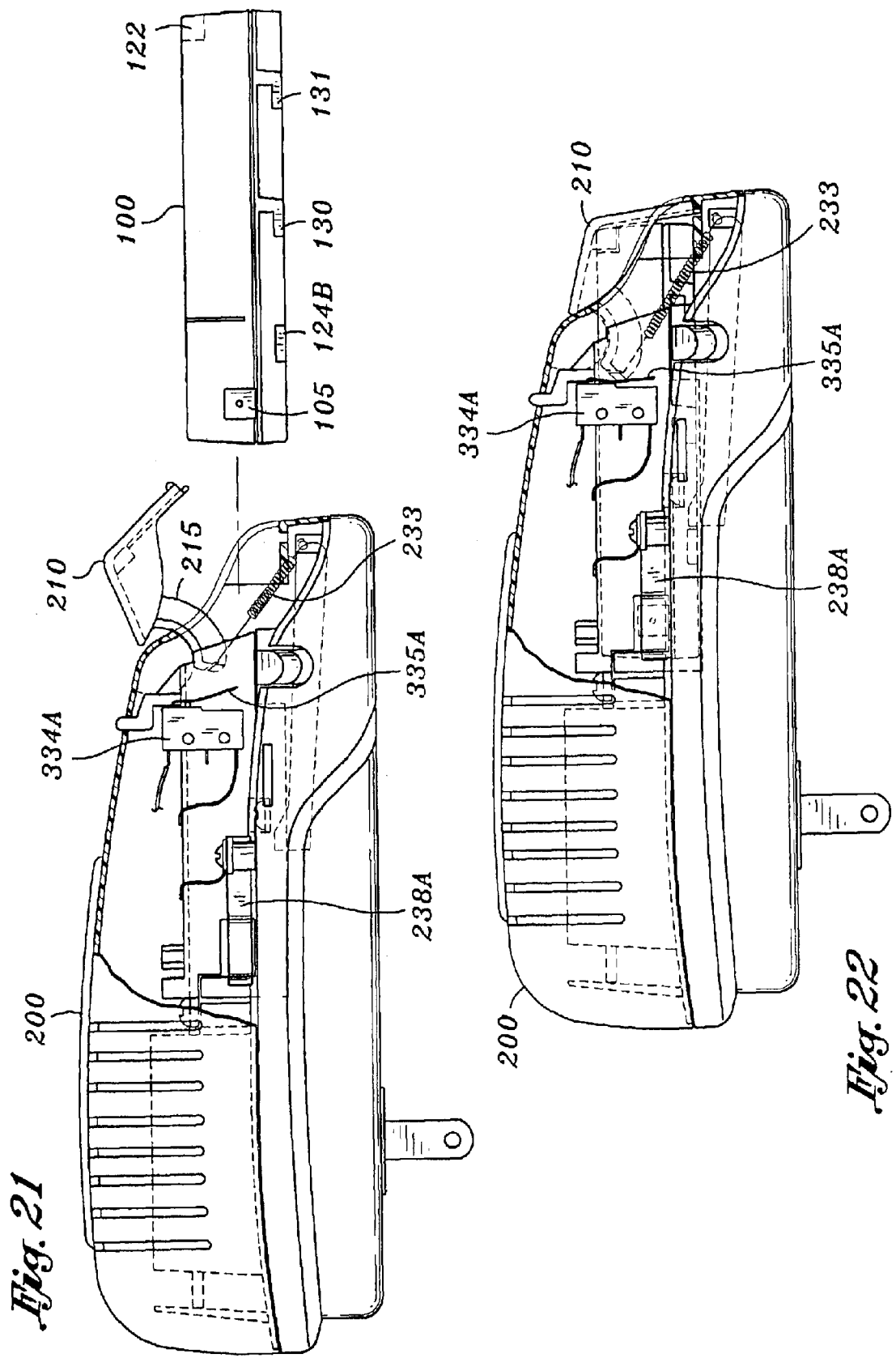

RECHARGEABLE BATTERY PACKS

CROSS REFERENCE TO RELATED APPLICATIONS

This application claims the benefit and is a divisional of application Ser. No. 09/915,463, filed Jul. 26, 2001 now U.S. Pat. No. 6,646,414 by David Small, now allowed. application Ser. No. 09/915,463, claims the benefit and is a divisional of Application No. 09/591,709, filed June 9, 2000 by David Small, now issued as U.S. Pat. No. 6,326,766.

FIELD OF THE INVENTION

This invention relates to battery charging systems and more particularly to battery chargers and rechargeable battery packs.

BACKGROUND OF THE INVENTION

Rechargeable batteries are well known in the prior art. Rechargeable batteries are capable of being charged prior to initial use and recharged after being discharged. Generally, rechargeable batteries are charged by a battery charger having a power supply that can provide a supply of DC current. A rechargeable battery accepts the electrical current and converts it into chemical energy. As long as the rechargeable battery is capable of converting the electrical current into chemical energy, the rechargeable battery will not significantly rise in temperature. When a rechargeable battery is at full capacity, it is incapable of converting the charge current into chemical energy and it dissipates any continuing charge current as heat. The heat generated by a rechargeable battery is an ideal parameter to sense that it has reached a fully charged state.

One or more rechargeable batteries are oftentimes packed together in series as a rechargeable battery pack to provide a desired operational voltage and current. The rechargeable battery packs are often used to power battery powered devices such as toys which are oftentimes operated by children. The rechargeable battery packs are removable from a battery powered device for a number of reasons. A reason for providing a removable rechargeable battery pack is that one battery pack can be remotely charged while another is being used in the battery powered device. The typical rechargeable battery pack has one or more rechargeable batteries coupled in series together. Two terminals of the rechargeable battery pack are coupled to each end terminal of the series of rechargeable batteries. At least one end terminal of the series of rechargeable batteries is typically coupled to one of the terminals of the battery pack by a wire. The rechargeable batteries are encased into a rechargeable battery case with a positive battery pack terminal protruding through an opening in one side of the case and a negative battery pack terminal protruding through another opening in the other side of the case in order to make contact with charging terminals of a battery pack charger. The rechargeable battery case is typically made of a plastic material that is insulating so as not to short to metal electrical contact points.

The typical rechargeable battery pack case is rectangularly shaped. The typical width of a rechargeable battery pack case is approximately the length of a rechargeable battery when rechargeable batteries are oriented therein side by side without stacking. The typical length of a rechargeable battery pack case is approximately the sum of the diameters or widths of rechargeable batteries held within the case for rechargeable batteries sitting side by side. On the left and right sides of the rechargeable battery pack case, there is a base edge and a top edge. The base edge has a narrower region than the typical width of the rechargeable battery pack case. To hold the rechargeable battery pack into a battery powered device or battery charger, the typical rechargeable battery pack case has multiple L shaped tabs along the base edge of one side and three mirrored-L shaped tabs along the base edge of the opposite side. The multiple L shaped tabs and the multiple mirrored-L shaped tabs protrude from the narrower region of the base edge to approximately have the typical width of the typical rechargeable battery pack. The shape and foot of the L and mirrored-L shaped tabs hold the battery pack in contact to the terminals of the battery powered device or battery charger.

The typical battery pack charger has open faced surfaces to couple with the rechargeable battery pack. The battery pack charger includes two opposing surfaces one having a positive electrical contact protruding through it and another having a negative electrical contact protruding through it. These electrical contacts are accessible to a user and typically do not have any safety concerns as the voltage on these terminals is below 24 volts which is considered a safe voltage. This low voltage is typical of low current chargers in that an isolation transformer is used to convert the 120 volt AC-line power into a lower voltage that is typically 12 volts AC. Higher current power systems are required if a battery is to be charged at a higher rate, which means a higher charge current. Higher current power supplies in some cases cannot employ an isolation transformer to step the 120 volt AC-line power down to a safe voltage. This is because an appropriate sized isolation transformer may be very expensive, large and heavy. Without an isolation transformer, the terminals of the charger may be unsafe to touch because a high voltage may be present at the electrical contacts. Touching just one terminal can result in shock because a current may be able to travel from the non-isolated electrical contact of the charger through a human body to ground.

When engaged, the rechargeable battery pack is not enclosed by the typical battery pack charger. The surfaces of the rechargeable battery pack are grabable by a user to engage or disengage it with the battery pack charger. To engage with a battery pack charger, the rechargeable battery pack is slid against a flat surface of the battery pack charger between the two opposing surfaces, orthogonal to the flat surface and separated by the width of the rechargeable battery pack, in order to make mechanical and electrical connections with the charger. The electrical and mechanical connections are made on the sides of the rechargeable battery pack. One of the two opposing surfaces of the battery pack charger has a negative electrical contact protruding through side to make electrical connection to the contact on one side of the rechargeable battery pack and another one of the two opposing surfaces has a positive electrical contact protruding through so as to make electrical connection with the contact on the other side of the rechargeable battery pack.

To make mechanical connections, the typical battery pack charger includes an upside down L shaped tab and an upside down mirrored-L shaped tab in the respective opposing surfaces. The battery pack case of the rechargeable battery pack, uses the L and mirrored-L shaped tabs closest to the terminals of its three L and mirrored-L shaped tabs to mate with the battery pack charger. The upside down L shaped tab of the battery pack charger mates with the first mirrored-L shaped tab of the rechargeable battery pack on one side. The upside down mirrored-L shaped tab of the rechargeable battery pack mates with the first L shaped tab of the rechargeable battery pack on the opposite side. The mating between these tabs, keeps the rechargeable battery pack from moving further forward, keeps it aligned with the electrical contacts and keeps the rechargeable battery pack coupled in place to the battery pack charger in one direction.

To hold the rechargeable battery pack in place in an orthogonal direction, the battery pack charger includes a spring loaded latch mechanism having a catch and a user push button. The spring loaded latch interfaces to one side only of the rechargeable battery pack when inserted. With the rechargeable battery pack being inserted, as the first mirrored-L shaped tab passes over the catch of the spring loaded latch, the catch of the spring loaded latch is depressed into the charger. After the end of the first mirrored-L shaped tab has passed, the catch of the spring loaded latch is released to protrude up behind the first mirrored-L shaped tab in order to hold the rechargeable battery pack to the battery pack charger. To release the rechargeable battery pack from the battery pack charger, a user depresses the button of the spring loaded latch to depress the catch so the first mirrored-L shaped tab can clear the catch as the rechargeable battery pack is pulled away by a user from the battery pack charger.

A typical low-cost battery charger provides a charging current that is a relatively low current to a rechargeable battery such that it can be sustained indefinitely without damaging the battery. This low current, typically between 25 milliamps and 100 milliamps, will safely charge a battery from a discharged state to a fully charged state in approximately 4 to 12 hours. This low current provided by the low cost battery charger is sometimes referred to as a trickle charge. The trickle charge current can be set to a level where the battery can safely dissipate excess current into heat without overheating the battery. Generation of excessive heat in a rechargeable battery will cause it to breakdown and reduce its useful lifetime. A disadvantage to using a low current and low cost battery charger is that it requires charging a battery for a relatively long period of time in order to reach a fully recharged state.

Rechargeable batteries in a rechargeable battery pack can be charged at higher rates using higher current levels than that used at slow charge rates. However when fast charging, safety precautions should be taken to prevent overheating of the batteries thereby preventing a possible fire, injury to a user, or damage to the battery or the battery charger. Preventing injury to a user is particularly important when a charging system is utilized by children to recharge batteries that are utilized in toys. Additionally, as new fast charge technology is applied to rechargeable batteries for use within toys, safety precautions become very important as a result. If no safety precautions are taken, then rechargeable battery packs should only be charged at slow rates using low current levels.

Some safety precautions for fast charging that can be taken is to assure that a battery charger will not charge a rechargeable battery at an excessively high rate and that the charging current is removed or reduced, such as to a trickle charge rate, shortly after the battery reaches its fully charged state. The charge rate refers to the level of charge current and the time to recharge a discharged battery. A charge rate is excessive if it exceeds the rate at which a rechargeable battery can convert the charge current into chemical energy. This occurs when the charging current level is higher than the maximum charge current rated for a given battery type and capacity. For example, a typical 50 milliamp-hour Nickel-Cadmium (NiCad) battery can safely be charged up to a charging current level of 200 milliamps while a 700 milliamp-hour NiCad battery can be safely charged up to a charging current level of 2.8 amps. Typically, NiCad battery construction will allow for a battery cell to be recharged at two to ten times its hour rating of battery capacity. Battery manufacturing techniques vary from manufacturer to manufacturer as well as from cell type to cell type which dictates the maximum charge rate for each cell. If the charge rate is excessive, the battery produces heat to dissipate the energy provided by the excessive charge current level. Regardless of the charge current level, when a battery reaches its fully charged state it is no longer capable of converting the charge current into chemical energy. In this case, the battery dissipates the extra charge current as heat and the current should be removed or reduced such as to a trickle charge current in order to avoid damage, maintain battery life, and protect persons and property from harm.

It is desirable to provide a fast charge battery charging system having safety features to avoid damage, maintain battery life, and protect persons and property from harm.

BRIEF SUMMARY OF THE INVENTION

The present invention includes the methods, systems and apparatus which are briefly summarized in the claims.

Briefly, a battery charging system including a rechargeable battery pack and a battery pack charger is disclosed. The rechargeable battery pack and the battery pack charger include mechanical safety mechanisms to safely charge the rechargeable battery pack using at least one fast charge rate. The rechargeable battery pack and the battery pack charger are mechanically and electrically coupled together in order to charge the rechargeable battery pack.

The rechargeable battery pack includes an opening to allow a temperature sensor to directly sense the temperature at a terminal case of a rechargeable battery cell in the rechargeable battery pack. A temperature sensor is used to determine when to automatically cutoff charging at the at least one fast charge rate. The rechargeable battery pack further includes one or more key slots along a rear edge in order to distinguish it from others. Additionally, rectangular guide tabs in the rechargeable battery pack of the present invention allow it to be backward compatible. The rechargeable battery pack of the present invention can be charged in former battery pack chargers and used to power former battery operated devices.

The battery pack charger includes one or more key tabs in a charger door that need to mate with the one or more key slots in the rechargeable battery pack in order for the charger door to close into a closed position and begin charging. The combination of the one or more key tabs with the one or more key slots provides a safety mechanism to assure that the appropriate battery pack is inserted which can be safely charged.

The battery pack charger further includes a high current charger power supply which is not electrically isolated from AC line power. The battery pack charger due to the non-isolated power supply design includes a safety switch mechanism that facilitates the safety system provided by the key slots in the battery pack and tabs on the charging door to avoid electrical shock to a user in the event that a user touches one of the charging terminals when a rechargeable battery pack is not inserted into the charger. The safety switch mechanism includes at least one switch to switch one circuit or a pair of switches to switch two circuits. In one embodiment the switch (or pair of switches) is a spring switch with a leaf spring contact or button. In another embodiment, the switch (or pair of switches) is a microswitch with a leaf spring lever activation. In yet another embodiment, the switch (or pair of switches) is formed of a conductive strip and a spring loaded conductive strip. One lever arm or and a pair of lever arms of the charger door of the battery pack charger are used to activate the safety switch mechanisms. The one or more lever arms activate (i.e. close, turn ON or switch ON) and deactivate the one or more switches (i.e. open, turn OFF or switch OFF) by applying or releasing a pressure or force on a contact point of the leaf spring contact, the button, the leaf spring lever, or the spring loaded conductive strip. When the charger door is closed, the lever arms push on the leaf spring contact, the button, the leaf spring lever, or the spring loaded conductive strip in order to close the switch to provided a closed circuit. With the charger door in an open position there is no pressure from the lever arm on the leaf spring contact, the button, the leaf spring lever, or the spring loaded conductive strip. Therefore, the safety switches are not closed and provide an open circuit when the charger door is in the open position. When the charger door is in a closed position, the closing of the safety switch mechanism (or mechanisms) allows power to be supplied to a rechargeable battery pack that is inserted into the battery pack charger.

The battery pack charger further provides rectangular guide tabs on sidewalls of an inner housing that allow the rectangular guide tabs of the rechargeable battery pack to slide under. The rectangular guide tabs of the battery pack charger further distinguish the type of rechargeable battery packs that can be fully inserted therein for safe charging.

The battery pack charger further includes a charger power supply on a printed circuit board with the appropriate circuitry to charge the rechargeable battery pack at the at least one fast charge rate. The battery pack charger includes a temperature sensor coupled to the printed circuit board at one end that reaches through the opening in the rechargeable battery pack to directly sense battery temperature at a terminal case of a rechargeable battery cell in the rechargeable battery pack.

BRIEF DESCRIPTIONS OF THE DRAWINGS

FIG. 6 is a left side elevational view thereof;

FIG. 7 is a front elevational view thereof;

FIG. 8 is a rear elevational view thereof;

FIG. 9 is a rear elevational view of a second embodiment of our new design for a rechargeable battery pack; and FIG. 10 is a top plan view thereof.

FIG. 12 is a bottom perspective view of the battery pack charger of the present invention.

FIG. 13 is a perspective view illustrating the battery pack charging system of the present invention.

FIG. 14 is an left side exploded view of the battery pack charger of the present invention.

FIG. 15 is a bottom sectional view of a first embodiment for the charger door of the battery pack charger to mate with the first embodiment of the rechargeable battery pack.

FIG. 16 is a bottom sectional view of a second embodiment for the charger door of the battery pack charger to mate with the second embodiment of the rechargeable battery pack.

FIG. 17 is a top sectional view of the battery pack charger of the present invention.

FIG. 19 is a right side cut-away sectional view of the battery pack charger with an open charger door to receive the rechargeable battery pack.

FIG. 20 is a right side cut-away sectional view of the battery pack charger with the rechargeable battery pack inserted therein.

FIG. 21 is a right side cut-away sectional view of an alternate embodiment of the battery pack charger with an open charger door to receive the rechargeable battery pack.

FIG. 22 is a right side cut-away sectional view the alternate embodiment of the battery pack charger with the rechargeable battery pack inserted therein.

The rechargeable battery pack is used to store an electric charge or energy and may be inserted into a battery pack charger or a battery powered device.

Figure 1:
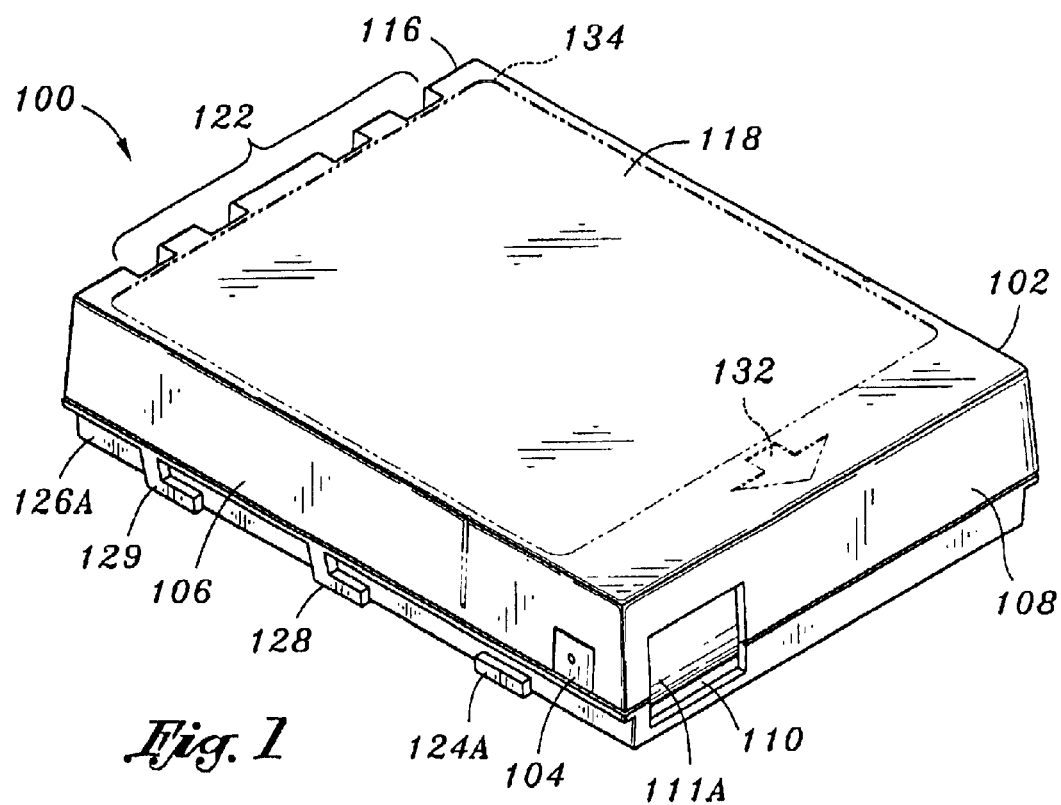
FIG. 1 is a front perspective view from above of a first embodiment of our new design for a rechargeable battery pack.
Figure 2:
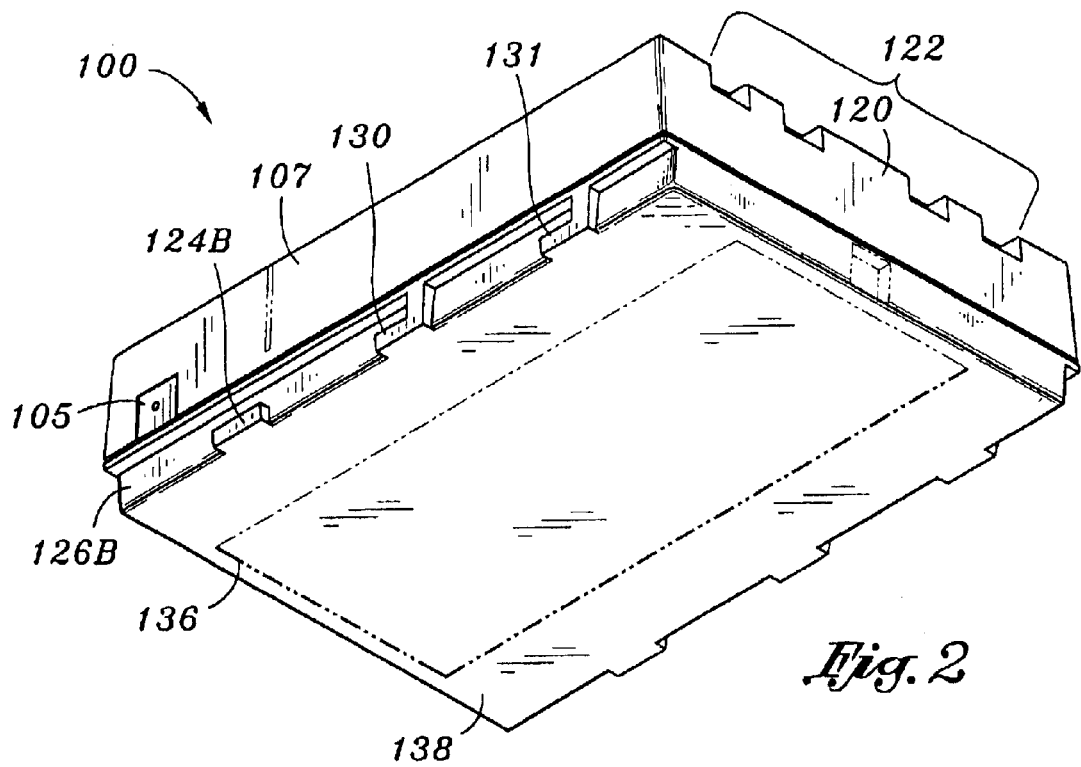
FIG. 2 is a rear perspective view from below thereof.
Figure 3:
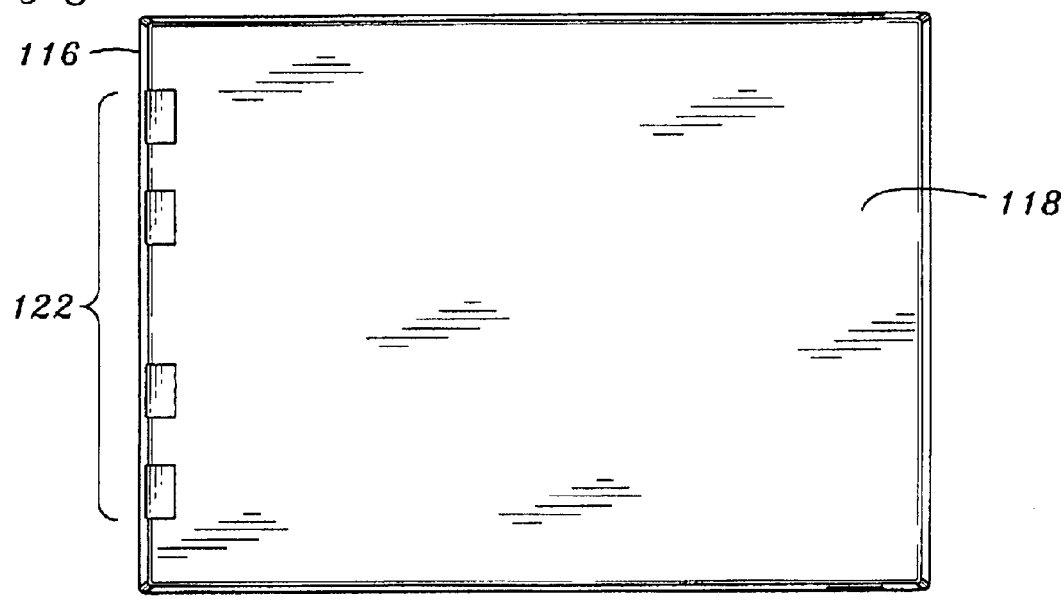
FIG. 3 is a top plan view thereof.
Figure 4:
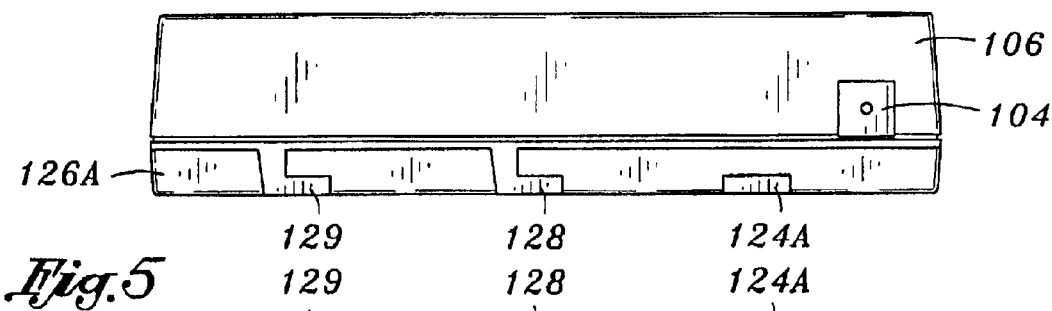
FIG. 4 is a right side elevational view thereof.
Figure 5:
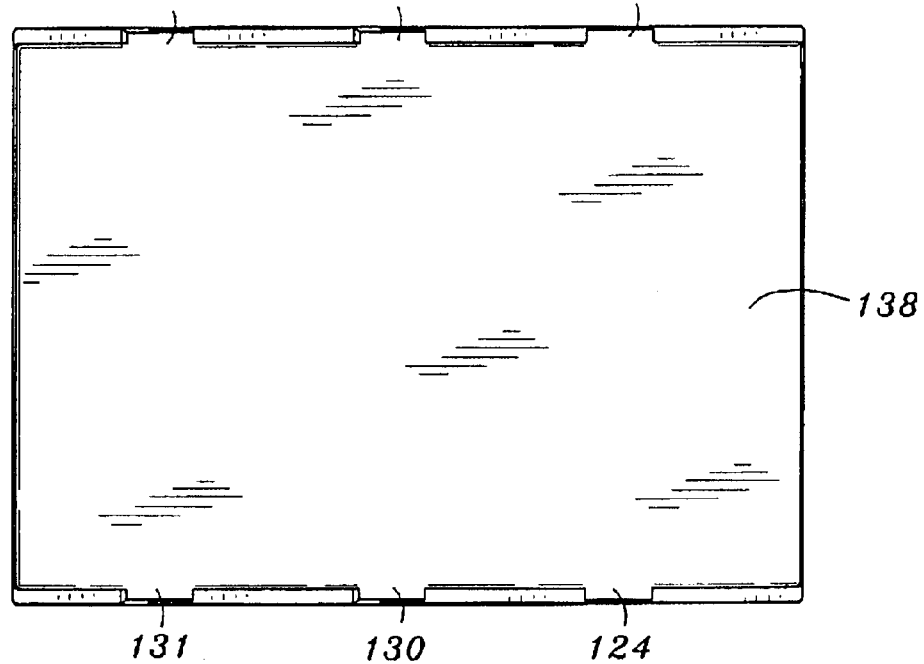
FIG. 5 is a bottom plan view thereof.

The broken lines shown in FIGS. 1 and 2 are for illustrative purposes only and form no part of the first or second embodiment of our new design for a rechargeable battery pack.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Briefly, a battery charging system including a rechargeable battery pack and a battery pack charger is disclosed. The rechargeable battery pack and the battery pack charger include mechanical safety mechanisms to safely charge the rechargeable battery pack using at least one fast charge rate. The rechargeable battery pack and the battery pack charger are mechanically and electrically coupled together in order to charge the rechargeable battery pack.

The rechargeable battery pack includes an opening to allow a temperature sensor to directly sense the temperature at a terminal case of a rechargeable battery cell in the rechargeable battery pack. A temperature sensor is used to determine when to automatically cutoff charging at the at least one fast charge rate. The rechargeable battery pack further includes one or more key slots along a rear edge in order to distinguish it from others. Additionally, rectangular guide tabs in the rechargeable battery pack of the present invention allow it to be backward compatible. The rechargeable battery pack of the present invention can be charged in former battery pack chargers and used to power former battery operated devices.

The battery pack charger includes one or more key tabs in a charger door that need to mate with the one or more key slots in the rechargeable battery pack in order for the charger door to close into a closed position and begin charging. The combination of the one or more key tabs with the one or more key slots provides a safety mechanism to assure that the appropriate battery pack is inserted which can be safely charged.

The battery pack charger further includes a high current charger power supply which is not electrically isolated from AC line power. The battery pack charger due to the non-isolated power supply design includes a safety switch mechanism that facilitates the safety system provided by the key slots in the battery pack and tabs on the charging door to avoid electrical shock to a user in the event that a user touches one of the charging terminals when a rechargeable battery pack is not inserted into the charger. The safety switch mechanism includes at least one switch to switch one circuit or a pair of switches to switch two circuits. In one embodiment the switch (or pair of switches) is a spring switch with a leaf spring contact or button. In another embodiment, the switch (or pair of switches) is a micro-switch with a leaf spring lever activation. In yet another embodiment, the switch (or pair of switches) is formed of a conductive strip and a spring loaded conductive strip. One lever arm or and a pair of lever arms of the charger door of the battery pack charger are used to activate the safety switch mechanisms. The one or more lever arms activate (i.e. close, turn ON or switch ON) and deactivate the one or more switches (i.e. open, turn OFF or switch OFF) by applying or releasing a pressure or force on a contact point of the leaf spring contact, the button, the leaf spring lever, or the spring loaded conductive strip. When the charger door is closed, the lever arms push on the leaf spring contact, the button, the leaf spring lever, or the spring loaded conductive strip in order to close the switch to provided a closed circuit. With the charger door in an open position there is no pressure from the lever arm on the leaf spring contact, the button, the leaf spring lever, or the spring loaded conductive strip. Therefore, the safety switches are not closed and provide an open circuit when the charger door is in the open position. When the charger door is in a closed position, the closing of the safety switch mechanism (or mechanisms) allows power to be supplied to a rechargeable battery pack that is inserted into the battery pack charger.

The battery pack charger further provides rectangular guide tabs on sidewalls of an inner housing that allow the rectangular guide tabs of the rechargeable battery pack to slide under. The rectangular guide tabs of the battery pack charger further distinguish the type of rechargeable battery packs that can be fully inserted therein for safe charging.

The battery pack charger further includes a charger power supply on a printed circuit board with the appropriate circuitry to charge the rechargeable battery pack at the at least one fast charge rate. The battery pack charger includes a temperature sensor coupled to the printed circuit board at one end that reaches through the opening in the rechargeable battery pack to directly sense battery temperature at a terminal case of a rechargeable battery cell in the rechargeable battery pack.

Reference is now made to FIGS. 1–11 illustrating the rechargeable battery pack 100 of the present invention. FIG. 1 is a front perspective view from above of a first embodiment of the rechargeable battery pack 100. Rechargeable battery pack 100 may also be referred to as a battery pack, energy pack or rechargeable battery cassette. FIG. 2 is a rear perspective view from below the first embodiment of the rechargeable battery pack 100. The rechargeable battery pack 100 includes a battery pack case 102, a first electrical contact 104 in a right side 106, a second electrical contact 105 in a left side 107, and one or more rechargeable batteries to store an electrical charge or energy. The rechargeable batteries are housed by the battery pack case 102 and can be Nickel-Cadmium (NiCad), Nickel-Metal-Hydride (NiMH), lithium-ion or other type of rechargeable battery. The rechargeable battery pack 100 is often used in children's toys and radio controlled vehicles receivers or transmitters.

The rechargeable battery pack case 102 is preferably made of an inexpensive rigid material such as plastic and may also be an insulating material so as not to short to metal electrical contact points or terminals. The first electrical contact 104 protrudes through an opening in the right side 106 of the battery pack case 102. The second electrical contact 105 protrudes through an opening in the left side 107 of the battery pack case 102. The first and second electrical contacts, also referred to as terminals, are for making an electrical connection to terminals of a battery powered device and a battery pack charger. Preferably the first electrical contact 104 on the right side 106 is a negative contact for coupling to the negative terminal of the battery pack charger or battery powered device. The second electrical contact 105 on the left side 107 is preferably a positive contact for coupling to the positive terminal of the battery pack charger or battery powered device.

A front side 108 of the battery pack case 102 has an opening 110 to allow contact to battery casing of the rechargeable battery 111A by a temperature sensor probe to thermally couple thereto. Opening 110 may be rectangularly shaped as illustrated or round, oval or otherwise to allow the temperature sensor probe to make contact with the rechargeable battery 111A. The opening 110 exposes the terminal casing of the rechargeable battery 111A near its end terminal. The exposed terminal casing preferably includes conductive material that is electrically and thermally coupled to the end terminal of the battery. In the preferred embodiment, the opening 110 is nearer the right side 106 to expose the terminal casing for the negative terminal of the rechargeable battery 111A. The opening 110 allows a battery pack charger that has a temperature sensor to make contact with the rechargeable battery 111A to measure its temperature at its terminal casing. In the preferred embodiment, the temperature sensor of a battery pack charger mechanically, thermally and electrically couples to the terminal casing of the rechargeable battery 111A.

Measuring the temperature of the rechargeable battery 111A can provide an indication of the charge condition of the battery in order to make determinations of charge current levels. If the rechargeable battery 111A is measured to have too high of a temperature, the charging can be stopped or reduced to a slow or trickle charge current level. The opening 111A facilitates one of the safety features of the present invention. If the rechargeable battery 111A includes conductive material connected to the electrical terminal of the battery as its exposed casing, the opening 110 allows the temperature sensor of the battery pack charger to make electrical contact with the rechargeable battery 111A. The electrical connection provides a means to assure that the temperature sensor is making proper contact with the rechargeable battery 111A by operating in a closed circuit. If not in a closed circuit, an open circuit exist and the battery pack charger may not charge at the fast charge rates as a result of a defect in the temperature sensing mechanism.

Figure 11:
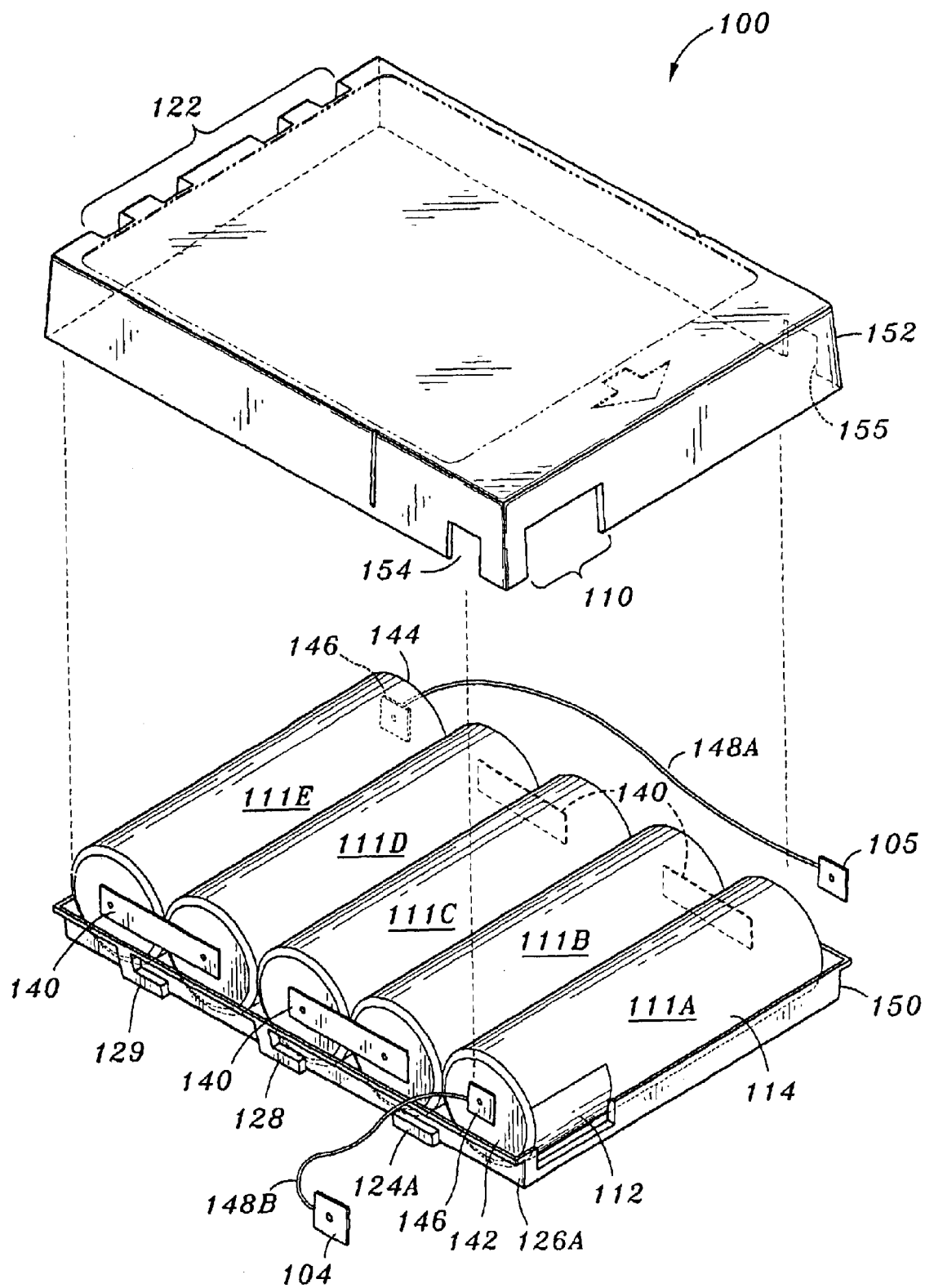
FIG. 11 is a front perspective exploded view from the top of the first embodiment of the rechargeable battery pack of the present invention.

In the preferred embodiment, the rechargeable battery 111A has a portion of an insulating skin cut away to reveal the conductive terminal casing of the negative terminal of the rechargeable battery 111A. Referring momentarily to FIG. 11, the area 112 of the insulating skin 114 of the rechargeable battery 111A has been cut away to allow direct contact by a temperature sensor to the negative terminal casing.

Referring now to FIGS. 1 and 2, a top rear edge 116, where a top surface 118 and a rear side 120 meet, includes one or more key slots 122 which are openings or recesses in the material forming the top rear edge 116 of the case. The openings for the key slots 122 extend from the a part of the rear side 120 through a part of the top surface 118 as shown in FIGS. 1 and 2. Referring momentarily to FIGS. 9 and 10, one elongated key slot 122' is illustrated along the top rear edge 116 as an alternate embodiment to the one or more key slots 122. Referring back to FIGS. 1 and 2, the one or more key slots 122 provide one of the safety features of the present invention. As discussed more fully later, the one or more key slots 122 act like keys for the rechargeable battery pack 100. The key slots 122 can mate to a locking feature in a battery pack charger in order to assure that a specific rechargeable battery pack is installed in the battery pack charger. The key slots 122 and locking feature precludes other rechargeable battery packs from being inserted and charged. This is because other rechargeable battery packs were not specifically designed to be safely charged by the given battery pack charger.

Various combinations in number, positions and sizes of the one or more key slots 122 along the rear edge 116 can be used to distinguish different rechargeable battery packs 100. For example, rechargeable battery packs may have different rechargeable battery types (i.e. Nickel-Cadmium, Lithium Ion, etc.) or differing numbers of rechargeable batteries with different voltage and/or current capabilities. The one or more key slots 122 along the rear edge 116 of the battery pack 100 can be used to distinguish these differences in the same battery case 102 having the same form factor. Additionally, the one or more key slots 122 can distinguish between battery packs with or without the opening 110. For example, rechargeable battery packs without the opening 110 do not provide a means for measuring the temperature at near the end terminal of the rechargeable battery 111A. It would therefore be unsafe to fast charge rechargeable battery packs without the opening 110 in a battery pack charger that fast charges and measures temperature through the opening 110 to determine when to slow or trickle charge. In which case the battery pack charger may continue to fast charge and may cause damage to the rechargeable battery pack, the battery pack charger or other property or persons. It is therefore desirable to differentiate between rechargeable battery packs that have the opening 110 from those that do not. The one or more key slots 122 can also provide a means of differentiating or distinguishing those rechargeable battery packs that have the opening 110. As an additional safety feature, the battery pack charger can detect when an electrical contact is made between the temperature probe and the terminal case of a rechargeable battery pack. Therefore, if the opening 110 in the case of the battery pack is missing, the temperature probe does not make contact and charging at a fast charge rate can be avoided or charging can be completely turned OFF in response.

The battery pack case 102 of the rechargeable battery pack 100 is rectangularly shaped. The size of the rechargeable battery pack case 102 in one embodiment is the same as the other rechargeable battery packs, such as the typical, in order to be backward compatible. That is, the rechargeable battery pack 100 has the same size and same location of electrical contacts so that it can be used to power former battery powered devices and be charged in former battery pack chargers. In another embodiment, the size, shape and location of electrical contacts of the rechargeable battery pack are proprietary and incompatible when compared with former rechargeable battery packs. In either case, the opening 110 and the key slots 122 provide safety features to assure the proper charging with the appropriate battery pack charger at fast charge rates. Additionally, the rechargeable battery pack 100 may be flexible such as that disclosed in U.S. Pat. No. 5,853,915 entitled "Foldable Multi-configuration Battery Pack" by Shohei Suto and incorporate the opening 110 at a front side and the one or more key slots 122 at an edge such as the rear edge.

In the preferred embodiment, the rechargeable battery pack case 102 includes rectangular guide tabs 124A and 124B along base regions 126A and 126B on the right side 106 and left side 107 respectively. In the embodiment where the rechargeable battery pack is backward compatible with former battery powered devices, there are two L shaped tabs 128 and 129 along the base region 126A on the right side 106 and two mirrored-L shaped tabs 130 and 131 along the base region 126B of the left side 107. The rectangular guide tabs 124A and 124B are the first guide tabs upon insertion and are nearest the front side 108 on respective right and left sides of the rechargeable battery pack. The tabs 128 and 130 are nearest the middle on respective right and left sides between the front side 108 and the rear side 120. The tabs 129 and 131 are the last guide tabs nearest the rear side 120 on respective right and left sides of the rechargeable battery pack. The two mirrored-L shaped tabs 130 and 131 on the left side are essentially the mirror images of the two L shaped tabs 128 and 129 on the right side. In another embodiment the tabs 128–131 are shaped to match a proprietary battery powered device. The rectangular guide tabs 124A and 124B and the two L shaped tabs 128–129 and the two mirrored-L shaped tabs 130–131 protrude from the narrower base regions 126A–126B to approximately have the same width of the rechargeable battery pack 100. Each of the rectangular guide tabs 124A and 124B include a front side, a rear side opposite the front side, a bottom side, a top side opposite the bottom side, and a front edge where the front side and bottom side couple. Each of the L shaped guide tabs 128–129 and mirrored-L shaped guide tabs 130–131 include horizontal portions referred to as feet and vertical portions. The guide tabs 124A and 124B, tabs 128–129, and shaped tabs 130–131, whatever their shape, guide and hold the rechargeable battery pack 100 in contact to the terminals of a battery powered device when properly engaged therein. The rectangular guide tabs 124A and 124B, L shaped guide tabs 128–129, and mirrored-L shaped guide tabs 130–131, also provide a quick-load system and reverse polarity protection in that they protect the rechargeable battery pack 100 from being inserted improperly into a battery charger.

In order to inform a user of the insertion direction of the rechargeable battery pack 100 into a battery pack charger, an arrow 132 may be included in or on the top surface 118 as illustrated in FIG. 1. In order to further identify the rechargeable battery pack 100 with the proper battery pack charger, colored labels 134 and 136 may be included in the top surface 118 and a bottom surface 138 respectively matching the color of a color label affixed to the battery pack charger (not shown). A user need only match the color of the label of the rechargeable battery pack with the color of the label on the battery pack charger to know that it can properly be charged therein.

Referring now to FIG. 9, a rear elevational view of a second embodiment of the rechargeable battery pack 100 is illustrated. The second embodiment of the rechargeable battery pack 100 includes the elongated key slot 122' along the top rear edge 116. Referring to FIGS. 9 and 10, the elongated key slot 122' is an opening or recess in the case 102 of the rechargeable battery pack 100 that extends from the rear side 120 to the top surface 118 along the top rear edge 116. As described in more detail below, the elongated key slot 122' mates with a surface of the battery pack charger to mechanically distinguish it from other types of rechargeable battery packs.

Referring now to FIG. 11, a front perspective exploded view from the top of the rechargeable battery pack 100 of the present invention is illustrated. The rechargeable battery pack 100 includes a plurality of rechargeable batteries 111A–111E connected in series together to form the desired voltage level of the rechargeable battery pack 100. Rechargeable batteries 111A–111E are preferably nickel-cadmium batteries, but, they also may be lithium-ion, nickel metal hydride or other rechargeable type of battery. FIG. 11 illustrates only four batteries connected in series but it is to be understood that more or less can be connected in series without departing from the spirit of the present invention. To couple the rechargeable batteries 111A–111E in series a number of shorting strips 140 can be used coupling the negative terminal of one rechargeable battery to the positive terminal of another rechargeable battery. Shorting strips 140 are conductive strips that are preferably metallic. The first electrical contact 104 of the rechargeable battery pack 100 is coupled to one end of wire 148B while an opposite end of wire 148B is coupled to the end terminal 142 of the rechargeable battery 111A. In this manner, the first electrical contact 104 couples to the end terminal 142 of the rechargeable battery 111A. In the preferred embodiment, the end terminal 142 is the negative terminal. An end terminal 144 of the rechargeable battery 111E is coupled to one side of a metal contact 146. The second side of the metal contact 146 is coupled to one end of wire 148A. The opposite end of wire 148A is coupled to the second electrical contact 105 of the rechargeable battery pack 100. In this manner, the second electrical contact 105 couples to the end terminal 144 of the rechargeable battery 111E. In the preferred embodiment, the end terminal 144 is the positive terminal.

After coupling the rechargeable batteries 111A–111E in series and to the contacts, they can be fitted into a bottom half 150 of the battery pack case 102. Then a top half 152 of the battery pack case 102 can be fitted over the rechargeable batteries 111A–111E, contacts, and shorting bars to enclose them and hold them in place. The top half 152 includes a right side contact opening 154 and a left side contact opening 155 to allow the first and second electrical contacts 104 and 105 respectively to protrude through the battery pack case 102. The area 112 of the insulating skin 114 of the rechargeable battery 111A has been cut away to allow direct contact to the terminal casing of the rechargeable battery 111A. In the preferred embodiment it is the negative terminal casing that is exposed through the area 112. Area 112 may be a small rectangular area as illustrated or it may be a cylindrical region around the battery 111A or a circular area or other shaped area that allows a temperature sensor to make direct contact to exposed terminal casing therein.

In order to allow a temperature sensor to reach in through to the rechargeable battery 111A, the battery pack case 102 includes the opening 110. The opening 110 may be completely formed in the top half 152 of the battery pack case 102. Alternatively, a portion of opening 110 can be formed in the top half 152 and another portion of opening 110 can be formed in the bottom half 150 of the battery pack case as illustrated in FIG. 11.

To complete the construction of the rechargeable battery pack 100 in its partial assembled form, the top half 152 is fixed to the bottom half 150 by either a glue, adhesive or an epoxy or by thermally fusing the materials together such as through welding. The top half 152 can vary depending upon the configuration of the one or more slots 122 that are used to distinguish the rechargeable battery pack 100. Base regions 126A and 126B are recesses in the right side 106 and left side 107 respectively of the bottom half 150 of the battery pack case 102.

As illustrated in FIG. 11, base region 126A includes the rectangular guide tab 124A, the L shaped tab 128, and the L shaped tab 129 protruding therefrom. The backward compatibility provided by the rectangular guide tabs 124A–124B, the L shaped tabs 128–129 and mirrored-L shaped tabs 130–131 allow the rechargeable battery pack 100 to be inserted into former battery pack chargers that charge at a slow charge rate. The backward compatibility provided by the rectangular guide tabs 124A–124B, the L shaped tabs 128–129 and mirrored-L shaped tabs 130–131 also allow the rechargeable battery pack 100 to be inserted into former battery powered devices.

Referring now to FIG. 12, a battery pack charger 200 of the present invention is illustrated. Battery pack charger 200 includes a pair of AC power spades 201 integrated into the battery pack charger 200 so it can directly couple into an AC outlet 302 without the use of an electrical cord. Battery pack charger includes a charger case 202 that includes a top half case 204 and a bottom half case 206. The top half case 204 includes air slot openings 208A–208C as illustrated in FIGS. 12 and 13 to allow air flow around the electronic components contained therein.

Referring now to FIG. 13, a perspective view of the battery pack charging system of the present invention is illustrated. The battery pack charging system of the present invention includes the battery pack charger 200 and the rechargeable battery pack 100. The battery pack charger 200 can charge at a trickle charge rate and at least one fast charge rate to speed charging of the rechargeable battery pack 100. The mechanical safety precautions provided by the present invention are undertaken in order to provide a safe battery pack charging system that can safely charge at the at least one fast charge rate.

The battery pack charger 200 includes a charger door 210 which opens and closes over an opening 212 within the battery pack charger 200. The rechargeable battery pack 100 is inserted into and extracted from the battery pack charger 200 through the opening 212. The charger door 210 at its exterior includes a knob 214 protruding from a rear surface, a left side arc shaped lever arm 215 protruding from a left side surface, and a right side arc shaped lever arm 216 protruding from a right side surface. The left side arc shaped lever arm 215 and right side arc shaped lever arm 216 move through slots 217 and 218 respectively in the top half case 204. The left side arc shaped lever arm 215 and right side arc shaped lever arm 216 allow the charger door 210 to rotably open in an arc to allow access to the opening 212. At end of each arc shaped lever arm 215–216 is a protrusion (not shown in FIG. 13, see FIG. 14) forming a latch 219 that latches to the top half case 204 when the charger door 210 is closed. Additionally, the end of each arc shaped lever arm 215–216 is shaped to form a leaf spring mechanical contact point. At an interior of the charger door 210 there are two rectangular latches 220 protruding from the rear edge that mate to two rectangular recesses 222 in the top half case 204 to further hold the charger door 210 in a closed position. The knob 214 allows a user to open and close the charger door 210. The battery pack charger 200 further includes a catch mechanism 224 that has left and right side finger releases 225–226 protruding through openings at the edge of the bottom half case 206 and top half case 204. The catch mechanism 224 described in more detail below is to lock the rechargeable battery pack 100 in place within the battery pack charger 200 so it doesn't fall or spring out of opening 212. The battery pack charger 200 further includes light emitting diode (LED) lenses 228 made from clear plastic to magnify the light intensity of LED's that may glow underneath.

Referring now to FIG. 14, a left side view of the battery pack charger 200 with the top half case 204 separated is illustrated. The right side is substantially a mirror image of the left side. The battery pack charger 200 further includes a charger power supply (e.g. a non-isolated switching power supply or a linear power supply) on a printed circuit board (PCB) 232 having an electronic control system. The charger power supply includes a bridge network to couple through the safety switch mechanisms and the AC power spades 201 to receive an AC line voltage and a non-isolated flyback transformer 230. The charger power supply generates a relatively low DC voltage having at least one high current rate which is used for the fast charge current and supply voltage of the charging output power. An electronic control system on the printed circuit board 232 couples to the charger power supply to control the charge current output including a trickle charge rate and the at least one fast charge rate. The electronic control system of the PCB 232 preferably senses temperature remotely, through signals from a temperature sensor, at the rechargeable battery 111A of the rechargeable battery pack 100 in order to safely control charging at the at least one fast charge rate. The temperature sensor and its connection to the electronic control system are discussed more below with reference to FIG. 18.

To assure that a charge voltage and current is safely applied, the battery pack charger includes one or a pair of safety switch mechanisms. In one embodiment, the pair of safety switch mechanisms are formed from a first pair of leaf spring conductive strips 234A–234B each having a leaf spring contact 235A–235B at one end and an electrical contact 236A–236B at another end, a pair of stationary contact strips 239A–239B, and the left and right side arc shaped lever arms 215–216 of the charger door 210. A pair of spring loaded strips 240A–240B are isolated from the stationary contact strips 239A–239B. In FIG. 14 only the left side is shown illustrating the leaf spring conductive strip 234A and the stationary contact strip 239A. Referring momentary to FIG. 17, the stationary contact strip 239A is on the left side and the stationary contact strip 239B is on the right side when viewed from above. The leaf spring conductive strip 234B and the stationary contact strip 239B and their respective elements on the right side are a mirror image of those on the left side and therefore need no further illustration.

Referring back to FIG. 14, each electrical contact 236A–236B of the respective leaf spring conductive strips 234A–234B and each stationary contact strip 239A–239B electrically couple between the AC line and the input terminals of the power supply of the printed circuit board 232. A screw on each side adjustably couples an end of each leaf spring conductive strip 234A–234B to an inner surface of the battery pack charger 200. Each leaf spring conductive strip 234A–234B is arc shaped near each leaf spring contact 235A–235B to form the leaf spring. Each leaf spring conductive strip 234A–234B is preferably formed of a metal strip such as copper in order to conduct electricity and form a leaf spring.

Each stationary contact strip 239A–239B is preferably formed of a metal strip such as copper in order to conduct electricity. Each stationary contact strip 239A–239B has an L shaped bracket formed near its end with an opening at its foot to allow a screw to be inserted and affix each to the battery pack charger 200. Each stationary contact strip 239A–239B is held in a stationary position inside the battery pack charger 200 in order to couple to the leaf spring conductive strips 234A–234B.

The spring loaded contact strips 238A–238B are for coupling to the terminals of a rechargeable battery pack 100 and are preferably formed of a metal strip such as copper in order to conduct electricity. Each of the spring loaded contact strips 238A–238B are electrically isolated from the stationary contact strips 239A–239B respectively. Each of the spring loaded contact strips 238A–238B has a spring loaded conductive strip portion 240A–240B which is U-shaped. The U-shaped spring loaded conductive strip portions 240A–240B extend through openings in the inner housing of the battery pack charger 100, prepared to make contact with contact terminals of a rechargeable battery pack 100. The base of the U-shaped spring loaded conductive strip portions 240A–240B extending through openings of an inner housing make contact with the first and second electrical contacts 104–105 when a rechargeable battery pack 100 is completely inserted into opening 212. Because the U-shaped spring loaded conductive strip portions 240A–240B extend through openings of the inner housing 250, the spring loaded contact strips 238A–238B may be touched by a user through opening 212 when the charger door 210 is open. The leaf spring conductive strips 234A–234B and each stationary contact strip 239A–239B, coupling to the AC line voltages, are behind the walls of the inner housing 250 without an opening or extension into the inner housing 250 and therefore can not be touched by a user.

In order to avoid shocking a user who may touch electrical contacts, such as a child, it is desirable to avoid placing a voltage onto the spring loaded contact strips 238A–238B while the charger door 210 is open. FIG. 19 illustrates the charger door 210 in an opened position while FIG. 20 illustrates the charger door 210 in a closed position. To automatically avoid a user from getting shocked, the safety switch mechanisms are employed. Each leaf spring conductive strip 234A–234B and each stationary contact strip 239A–239B is mounted in the battery pack charger such that there is a gap 241A between the leaf spring contact 235A and the stationary contact strip 239A and a gap 241B between the leaf spring contact 235B and the stationary contact strip 239B, when the charger door 210 is in an open position. The gaps 241A–241B between the contacts of the conductive strips electrically decouple each stationary contact strip 239A–239B from each leaf spring conductive strip 234A–234B.

To close the gap 241A between the leaf spring contact 235A and the stationary contact strip 239A and the gap 241B between the leaf spring contact 235B and the stationary contact strip 239B, the respective end 242A–242B of the left and right side arc shaped lever arms 215–216 of charger door 210 mechanically couple to the backside of each leaf spring conductive strip 234A–234B near each leaf spring contact 235A–235B. When the charger door 210 is closed, such as illustrated in FIG. 20, each end 242A–242B of each arc shaped lever arm 215–216 sufficiently depresses the leaf spring in each conductive strip 234A–234B to close the respective gaps and allow leaf spring contact 235A to make contact with the stationary contact strip 239A and the leaf spring contact 235B to make contact with the stationary contact strip 239B, mechanically and electrically coupling them together.

The leaf spring switch mechanism opens and closes operationally by respectively opening and closing the charger door 210 as illustrated by FIGS. 19 and 20. Only when the charger door 210 is closed are AC line voltages used to provide a charging power to the spring contact terminals 240A–240B through operation of the safety switches. When a rechargeable battery pack 100 is inserted into the battery pack charger 200, the safety switch mechanisms in one embodiment control when AC power is coupled into the charger.

To distinguish rechargeable battery packs that are safe to charge or otherwise, the battery pack charger in one embodiment includes one or more key tabs to mate or interface with one or more key slots of the rechargealbe battery pack. The one or more key tabs may be positioned inside the inner housing, such as at the front surface, of the battery pack charger or coupled to a charger door. In this case the rechargeable battery pack needs to have the one or more key slots properly positioned to mate so that so that the charger door can close or so that it can be fully inserted into the housing and the charger door can close. In another embodiment, the key slots and key tabs are swapped such that the battery pack charger has the one or more key slots and the rechargeable battery pack has the one or more key tabs. The one or more key slots may be positioned inside the inner housing, such as at the front surface, of the battery pack charger or in the charger door. In this case, the rechargeable battery pack needs to have the one or more key tabs properly positioned to mate with the one or more key slots in the battery pack charger so that the charger door can close or so that when fully inserted into the housing the rechargeable battery pack cuases a safety switch to close and the rechargeable battery pack can be charged.

Referring now to FIG. 15, a bottom sectional view from the rear of a first embodiment of charger door 210 is illustrated. The charger door 210 includes the rectangular latches 220 protruding from the bottom edge. The rectangular latches 220 also protrude from a back surface 244 of the charger door as illustrated. The first embodiment of charger door 210 further includes one or more key tabs 246 that protrude from the back surface 244 and a bottom surface 248. The one or more key tabs 246 mate with the one or more key slots 122 of the first embodiment of the rechargeable battery pack 100 when the charger door 210 is closed. If the pattern of the one or more key slots 122 on a rechargeable battery pack differs in number or position from those of the one or more key tabs 246, charger door 210 will not close completely to operationally close the leaf spring switch mechanism and complete a circuit. In this case, the rechargeable battery back with the differing one or more key slots 122 will not be charged. The one or more key tabs 246 provide differentiation between the types of rechargeable battery packs that can be charged within the battery pack charger 200. One point of differentiation is whether a rechargeable battery pack has opening 110 or not to allow a temperature sensor to probe the battery temperature. The one or more key tabs 246 and the one or more key slots 122, provides assurance that the proper type of rechargeable battery pack 100 will be safely charged within the battery pack charger 200 for which it was designed.

Referring now to FIG. 16, a bottom sectional view from the rear of a second embodiment of charger door 210 is illustrated. The second embodiment of charger door 210 includes an elongated key tab 246' that protrudes from the back surface 244 and the bottom surface 248. The elongated key tab 246' mates with the elongated key slot 122' of the second embodiment of the rechargeable battery pack 100 when the charger door 210 is closed. If the size of the elongated key slot 122' on a rechargeable battery pack differs in size or position from those of the elongated key tab 246', charger door 210 will not close completely to operationally close the leaf spring switch mechanism and complete a circuit. In this case, the rechargeable battery back with the differing elongated key slot will not be charged. The elongated key tab 246' provides differentiation between the types of rechargeable battery packs that can be charged within the battery pack charger 200. One point of differentiation that the charger door 210 can provide is whether or not a rechargeable battery pack has opening 110 to allow a temperature sensor to probe the battery temperature while fast charging.

Referring now to FIG. 17, a top sectional view of the bottom half case 206 of the battery pack charger 200 without the printed circuit board 232 and transformers s illustrated. FIG. 17 illustrates the stationary contact strips 239A and 239B and how they are held in a stationary position inside the battery pack charger 200. FIG. 17 further shows the spring loaded contact strips 238A–238B with their U-shaped spring loaded strip portions 240A–240B extending through openings of the inner housing 250. Details of the catch mechanism 224 are also visible in FIG. 17. The catch mechanism 224 includes the finger releases 225 and 226 that protrude through the charger case 202. The catch mechanism 224 also includes a spring lever arm 252 near its mid point, a left catch 253 and a right catch 254 at opposing ends of a pair of catch arms. The pair of catch arms and the spring lever arm are coupled to a pivot shaft that allows them to rotate in an arc providing an up and down movement. The finger releases 225 and 226 are coupled to center portions of the pair of catch arms. Underneath the spring lever arm 252 is a spring 256 to lift up the left catch 253 and right catch 254 so as to protrude the bottom of the inner housing 250. The left catch 253 and the right catch 254 engage the rear sides of the respective rectangular guide tab 124A–124B of the rechargeable battery pack 100 to hold it in place. The left catch 253 and right catch 254 are each ramped shaped from a rear edge toward their tops to slidably engage the rechargeable battery pack 100 when its inserted. Initially the front edges and then the bottom sides of the rectangular guide tabs 124A–124B of the rechargeable battery pack 100 slidably engage the ramps of the right catch 254 and the left catch 253 to depress the catch mechanism 224 and compress the spring 256. The front sides of the left catch 253 and the right catch 252, being furthest from the lever arm 252, are vertical surfaces. This is so that the rectangular guide tabs 124A–124B, after completely passing over the left catch 253 and the right catch 254, can be lockably engaged and not slidably depress the catch mechanism in the reverse direction. When a user presses either or both finger releases 225 and 226, the spring 256 compresses and the catches 253–254 are depressed below the bottom of the inner housing 250 to allow the rectangular guide tabs 124A–124B and the rechargeable battery pack 100 to slide out from the opening 212.

Coupled to the side walls of the inner housing 250 are a left rectangular guide tab 257 and a right rectangular guide tab 258. Upon insertion of rechargeable battery pack 100, the rectangular guide tabs 124B and 124A of the rechargeable battery pack 100 slide under the left rectangular guide tab 257 and the right rectangular guide tab 258 respectively when initially slid in. The rectangular guide tabs 124A–124B then slide over the respective catches 253–254 to depress them and compress the spring 256 momentarily until the rear sides of the rectangular guide tabs 124A–124B clear. After the catches 253–254 have cleared the rear sides of the rectangular guide tabs, the spring 256 decompresses and lifts the left catch 253 and right catch 254 to protrude through the bottom of the inner housing 250 behind them to hold the rechargeable battery pack in place. Feet of the mirrored-L shaped tab 130 and the L shaped tab 128 first slide under the left rectangular guide tab 257 and the right rectangular guide tab 258. A rear portion of each of the left rectangular guide tab 257 and the right rectangular guide tab 258 then engage respectively with the mirrored-L shaped tab 130 and the L shaped tab 128. The rechargeable battery pack 100 slides into opening 212 until the vertical portions of the mirrored-L shaped tab 130 and the L shaped tab 128 catch the respective rear portions of the left rectangular guide tab 257 and the right rectangular guide tab 258 to stop it.

The left rectangular guide tab 257 and the right rectangular guide tab 258 provide a further safety feature in that they stop former rechargeable battery packs from being completely inserted and unsafely charged therein. Former rechargeable battery packs first have an L shaped tab and an mirrored-L shaped tab on respective sides in front nearest the terminals which keep it from being completely inserted into the battery pack charger 200. The vertical portion of the first mirrored-L shaped tab and the first L shaped tab of the former rechargeable battery packs catch the rear portions of the left rectangular guide tab 257 and the right rectangular guide tab 258 to stop it from further insertion. Thus, the left rectangular guide tab 257 and the right rectangular guide tab 258 act as deterrents to inserting former rechargeable battery packs, not having opening 110 for temperature sensing, into the fast charging system of the present invention with the at least one fast charging rate. The battery pack charger essentially has features to lock out rechargeable battery packs that are unsafe to charge at its at least one fast charge rate.

To make an electrical coupling to the rechargeable battery pack 100, the U-shaped conductive strip portions 240A–240B extend through openings of the inner housing 250 become compressed and couple to the second electrical contact 105 and the first electrical contact 104 respectively upon full insertion of the rechargeable battery pack 100. The temperature sensor contact 259 protrudes out through an opening and into the inner housing 250 to make contact with an inserted rechargeable battery through its opening 110.

Figure 18:
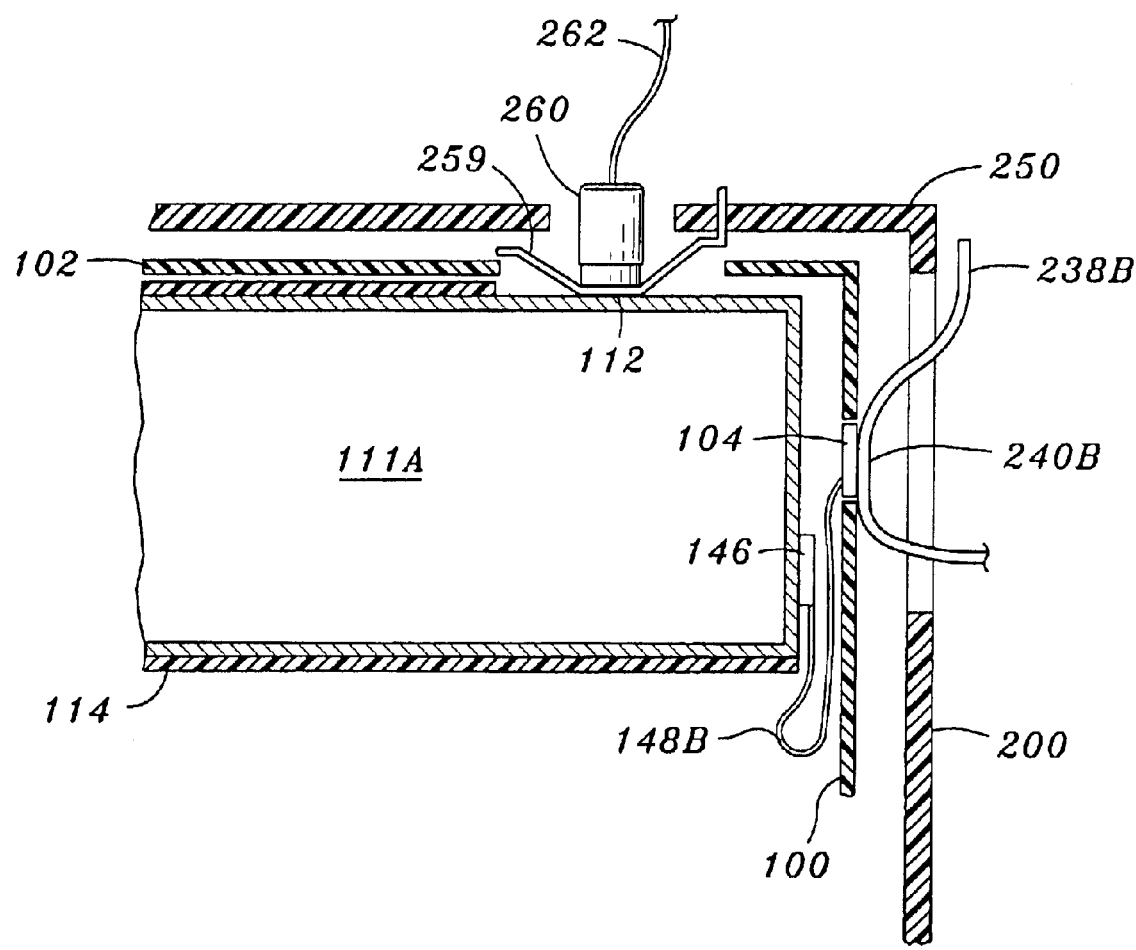
FIG. 18 is a top sectional magnified view of the temperature sensor of the battery pack charger probing the temperature of a battery in the rechargeable battery pack.

Referring now to FIG. 18, a magnified sectional view of the temperature sensor area of the battery pack charger 200 and rechargeable battery pack 100 is illustrated. The battery pack charger 200 includes a temperature sensor for sensing battery temperature. The temperature sensor, also referred to as a temperature probe herein, is used to determine the optimum time to turn off at least one fast charge rate generated by the battery pack charger 200. In the preferred embodiment, the temperature sensor is a thermistor 260 coupled to the temperature sensor contact 259 as shown in FIG. 18. A thermistor is an electronic device that makes use of a change in the resistivity of a semiconductor to indicate change in temperature. The resistance of a thermistor varies as a function of temperature when heat is applied. Other electronic devices that can measure or sense temperature and vary resistance, current or voltage of the electronic device as a function of temperature, may be substituted for a thermistor.

The thermistor 260 is electrically coupled to the electronic control system of the printed circuit board 232 through wire 262 at one end. The thermistor 260 protrudes through the inner housing 250 and is mechanically and electrically coupled to the contact terminal 259. Preferably the thermistor 260 is soldered to the contact terminal 259. The contact terminal 259 protrudes from the inner housing 250 through the opening 110 in the rechargeable battery pack 100 to make contact with the rechargeable battery 111A. The thermistor 260 couples through the contact terminal 259 to the terminal case of the rechargeable battery 111A in the area 112 where the insulating skin 114 is removed.

Heat at the terminal case in the area 112 of the rechargeable battery 111A is conducted into the front side of temperature sensor contact 259 through to its back side and into the thermistor electrode of the thermistor 260 coupled to the backside of the temperature sensor contact 259. Heat at the thermistor electrode conducts into the body of the thermistor 260 and causes its resistance to vary indicating a measure of battery temperature. The heat conducting materials between the battery 111A and the thermistor 260 are preferably metallic in order to better conduct heat.

The thermistor 260, coupling to the conductive terminal casing of the rechargeable battery 111A, completes a circuit through the rechargeable battery casing, the spring loaded contact strip 238B, and the leaf spring conductive strip 234B to the electronic control system of printed circuit board 232. In this manner the thermistor and the thermistor circuit can be analyzed to determine if its functioning properly.

Referring now to FIG. 19 and FIG. 20. FIG. 19 illustrates a right side cut-away sectional view of the battery pack charger 200 with its charger door 210 open ready to receive the rechargeable battery pack 100. To keep the charger door 210 open to insert a rechargeable battery pack 100, a pair of springs 233 are used each coupling to an end of the lever arms 215–216 and a pair of tabs one each side of the bottom half case 206. FIG. 20 illustrates a right side cutaway sectional view of the battery pack charger 200 with the rechargeable battery pack 100 completely engaged therein with its charger door 210 closed. The side view of the charger door 210 and rechargeable battery pack 100 illustrates how the one or more key tabs 246 mate with the one or more key slots 122 of the rechargeable battery pack 100 when its inserted.

FIG. 19 illustrates how the rechargeable battery pack 100 engages the left catch 253 and the rectangular guide tab 124B in greater detail with the right catch 254 and rectangular guide tab 124A being mirror images. The left catch 253 has a ramp shaped on the rear side and a vertical surface on the front side so that the rectangular guide tab 124B of the rechargeable battery pack can depress it when inserted but not after it has passed. The placement height on the sidewall of the rectangular guide tab 252 from the bottom of the of the inner housing 250, allows the rectangular guide tab 124B to slide underneath.

As illustrated in FIG. 19 with the charger door 210 being open, there is a gap 241A between the leaf spring contact 235A of the leaf spring conductive strip 234A and the stationary contact 239A of the spring loaded conductive strip 239A. When closing the charger door 210, the arc shaped lever arm 215 rotates through an arc so that the end 242A mechanically couples to the leaf spring conductive strip 234A near the leaf spring contact 235A. Closing the charger door 210 further to its closed position compresses the leaf spring of the leaf spring conductive strip 234A sufficiently enough such that the leaf spring contact 235A contacts the stationary contact 239A electrically coupling them together while the charger door 210 is closed.

FIG. 20 illustrates how the rectangular latches 220 on charger door 210 interface to the rectangular recesses 222 when it is fully closed. The rectangular latches 220 engaged into the rectangular recesses 222 keep the charger door 210 closed and do not allow the spring force of the leaf spring conductive strips 234A–234B to force it open.

To extract the rechargeable battery pack 100 from the battery pack charger, a user opens the charger door 210 using knob 214 to disengage the rectangular latches 220 from the rectangular recesses 222. The user then presses down on one or both of the finger releases 225–226 moving the catch mechanism to compress the spring 256 and lower its arms and the left and right catches 253–254. With the charger door 210 open and the catch mechanism depressed, the rear of the rechargeable battery pack can be grabbed by a user and pulled out.

Figure 23:
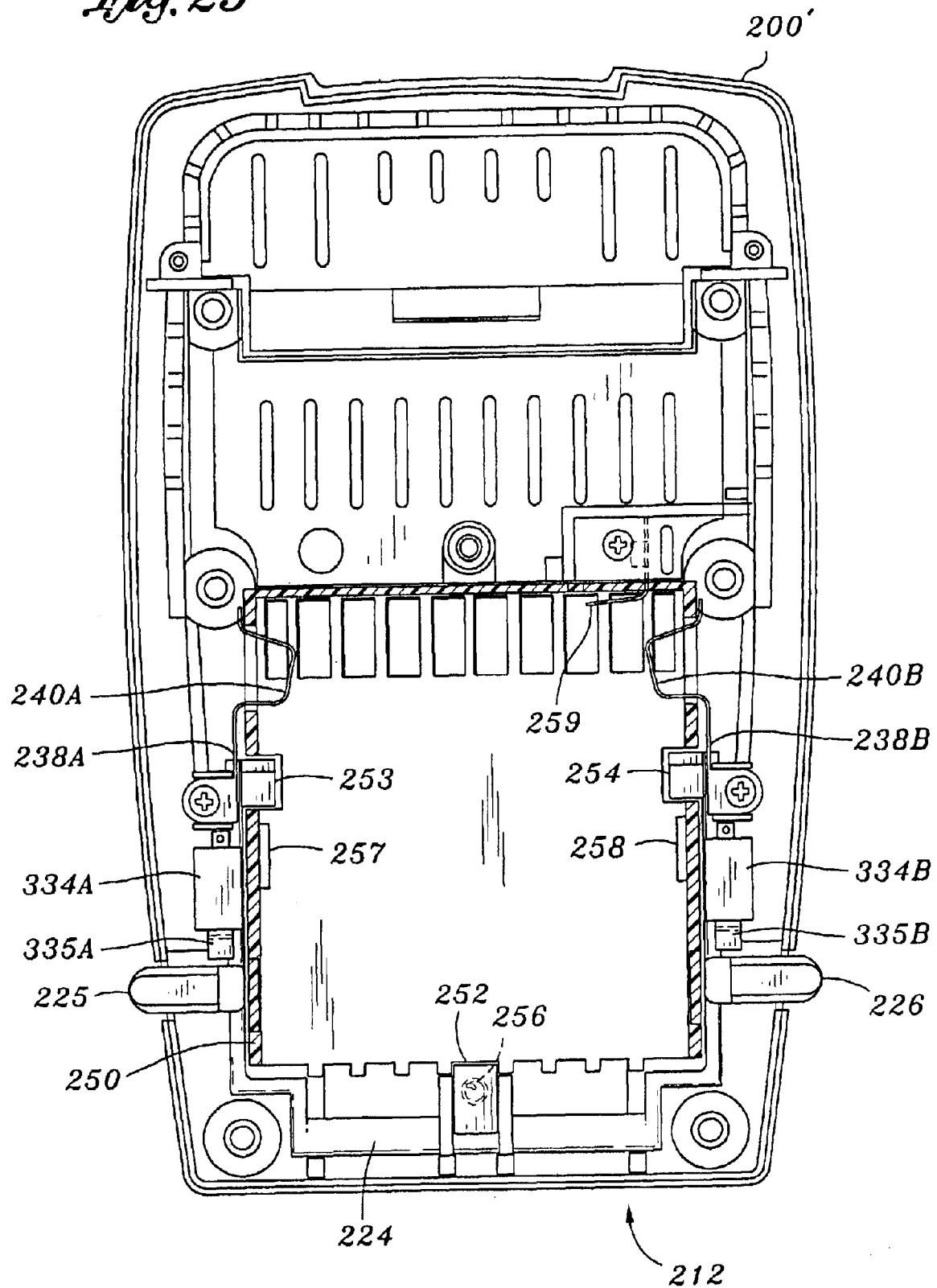
FIG. 23 is a top sectional view of the alternate embodiment of the battery pack charger of the present invention.

Referring now to FIGS. 21, 22 and 23, an alternate embodiment of the battery pack charger 200' is illustrated. In this alternate embodiment, the safety switch mechanisms are implemented using micro-switches 334A and 334B. Micro-switches 334A and 334B and spring loaded conductive strips 338A and 338B in FIGS. 21, 22, and 23 have replaced the leaf spring conductive strips 234A and 234B, leaf spring contacts 235A and 235B, electrical contacts 236A and 236B, stationary contacts 239A and 239B, and gaps 241A and 241B in FIGS. 14, 17, 19, 20. Otherwise, the battery pack charger 200' is similar to the battery pack charger 200.

Referring now to FIG. 21, a right side cut-away sectional view is illustrated of the alternate embodiment of the battery pack charger 200' with its charger door 210 open to receive the rechargeable battery pack 100. FIG. 21 illustrates a side view of the micro-switch 334A while micro-switch 334B is a mirror image on the opposite side. Micro-switches 334A and 334B include spring loaded levers 335A and 335B respectively to activate (i.e. close or switch ON) and deactivate (i.e. open or switch OFF) them. The spring loaded levers 335A and 335B are electrically isolated from any switch contacts and thus may be touched by a user without risk of shock. The charger door 210 in a closed position activates the micro-switches 334A and 334B. The charger door 210 in an open position deactivates the micro-switches 334A and 334B. The ends 242A and 242B of the lever arms 215 and 216 of the charger door 210 couple to the spring loaded levers 335A and 335B respectively to activate and deactivate the micro-switches 334A and 334B. In FIG. 21, the charger door 210 is open and the micro-switches 334A and 334B are both deactivated.

Referring now to FIG. 22, a right side cut-away sectional view is illustrated of the alternate embodiment of the battery pack charger 200' with the rechargeable battery pack 100 inserted therein. In FIG. 22, the charger door 210 is closed so that the micro-switches 334A and 334B are both activated. The ends 242A and 242B of the lever arms 215 and 216 of the charger door 210 apply pressure to the spring loaded levers 335A and 335B respectively to activate the micro-switches 334A and 334B.

Referring now to FIG. 23, a top sectional view is illustrated of the alternate embodiment of the battery pack charger 200'. In FIG. 23, a top view of the micro-switches 334A and 334B and spring loaded contact strips 238A and 238B is illustrated.

Figure 24:
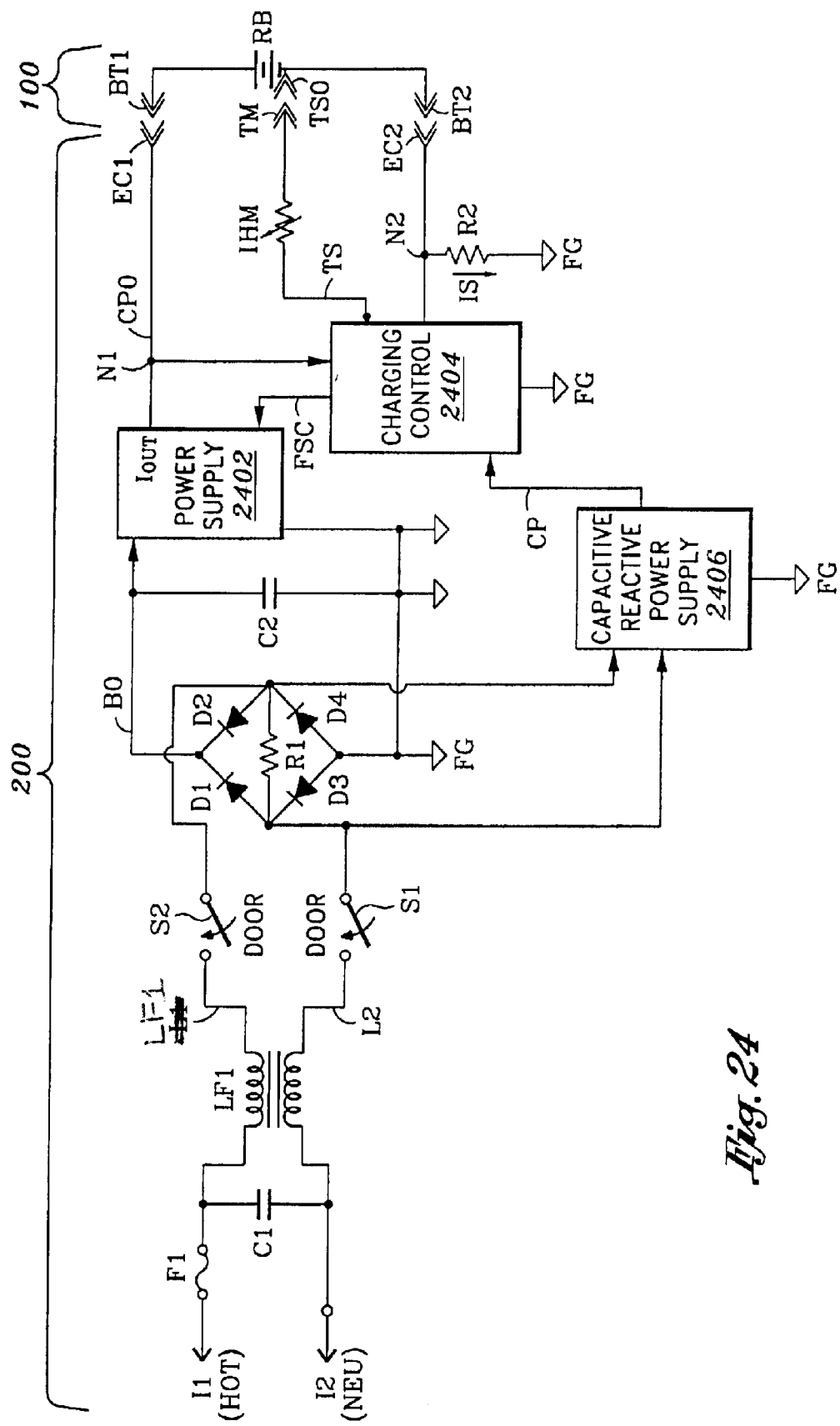
FIG. 24 is a simplified schematic block diagram representation of the electronics of the battery pack charger of the present invention.

Referring now to FIG. 24, a simplified schematic block diagram representation of the electronics of the battery pack charger 200/200' and battery pack 100/100' is illustrated. The electronics of battery pack charger operate using a floating ground system based on the AC line power that is provided. As coupled together in FIG. 24, the electronics of the battery pack charger 200/200' includes a fuse F1, a line capacitor C1, a line filter LF1, a first safety switch S1, a second safety switch S2, a bridge rectifier (consisting of diodes D1, D2, D3 and D4 and resistor R1), a capacitor C2, a power supply 2402, a charging control 2404, a capacitive reactive power supply 2406, a first electrical contact Ed1, a second electrical contact EC2, a current sense resistor R2, and a temperature measuring sensor THM with a thermal contact TM. In the preferred embodiment, the power supply 2402 is a switching power supply but can be a linear power supply as well to generate the desired charging power output for the charging voltages and charging currents. The battery pack charger 200 plugs into an AC line voltage source through the AC power spades J1 and J2. In the preferred embodiment with switches S1 and S2, either of AC spade J1 or AC spade J2 can couple to the hot line voltage or the neutral line voltage. If it is desirable to use only one safety switch, AC spade J1 and J2 should be polarized so the hot 120 volt AC line is switched by the one safety switch. An AC voltage of approximately 120 volts in the United States (other AC voltages are available in other countries) is found between nodes L1 and L2 when the AC power spades 201 of the battery pack charger 200 are plugged into an AC power outlet such as those found in homes. With the switches S1 and 32 closed, the AC voltage is coupled into the bridge rectifier formed from diodes D1–D4 and resistor R1. The anodes of diodes D3 and D4 are coupled together to form a floating ground (FG). The bridge rectifier and capacitor C2 generate a relatively stable DC voltage between the output BO and floating ground FG. As compared with earth ground, BO and FG are half wave rectified with respect to line AC voltage and will therefor have one half of the line voltage present on each point (approximately 60 volts AC) The electrical contact EC2 couples to FG through the resistance of resistor R2. The electrical contact EC1 couples to FG through the impedance of the power supply 2402. Because each of these paths are of low impedance, the electrical contacts EC1 and EC2 and the battery terminals BT1 and BT2 respectively will also be at 60 volts AC with respect to earth ground when the rechargeable battery pack RB is inserted and switches S1 and S2 are closed.

The bridge diode circuit, consisting of diodes D1, D2, D3, and D4 and resistor R1, converts the AC line voltage between nodes L1 and L2 into a DC voltage which is coupled into the power supply 2402. The power supply 2402 receives the DC voltage between the output BO and the floating ground to generate the charging power output on the node CPO. The node CPO from the power supply 2402 is directly coupled to the first electrical contact EC1. The charging power output on node CPO from the power supply 2402 is controlled by the charging controller 2404. The charging controller generates a fast/slow charge (FSC) control signal which is coupled into the power supply 2402. The FSC control signal selects the charging power output CPO from the power supply 2402 in response to electrical conditions surrounding the terminals that can couple to a rechargeable battery pack 100. The charging controller 2404 receives the charge voltage from the power supply 2402 on CPO, an indicator of battery temperature on TS, and an indication of the current supply IS through a rechargeable battery pack. A temperature sensor THM (such as a thermistor) is used to provide an indication of battery temperature through its proportionate variable resistance over temperature. The temperature sensor THM can provide an indication of the temperature of a rechargeable battery in the rechargeable battery pack 100 to help determine the overall charge condition of the rechargeable battery pack. The temperature indication of the rechargeable battery provides an indication of the charge condition of the rechargeable battery pack 100. The temperature indication from the temperature sensor THM is coupled into the charging controller 2404 on TS. The current supply IS is sensed by measuring the voltage across the resistor R2 from the second electrical contact EC2. R2 is a known low value and depending upon the voltage level, the current level can be determined from the equation for Ohm's Law where current equals the measured voltage divided by the resistance (I=V/R).

While the power supply 2402 generates the high power supply for charging rechargeable battery packs, the capacitance reactive power supply 2406 generates a circuit power CP for the charging control logic 2404. The circuit power CP is a stable low power supply so that the charging control logic 2404 accurately generates control signals for controlling the power supply 2402 and the charging of a rechargeable battery pack 100.

The power supply 2402, charging control 2404, capacitive reactive power supply 2406, and resistor R2, all have their respective circuit grounds coupled to the floating ground FG. Because FG can float to one half line voltage or more in the US and is coupled into these circuits, the electrical contacts EC1 and EC2 and the thermal contact TM can also float to such AC levels. If a user were to touch any of these three contacts, a shock could result if the user were simultaneously touching an earth ground source.

Additionally, the power supply 2402 includes a non-isolated transformer in the switching power supply embodiment to generate a DC power output for the charging currents and charging voltages. A non-isolated transformer is desirable because of its desired performance characteristics, its small size and its low cost. However, a non-isolated transformer allows line voltages to be coupled to the circuitry and can therefore couple a high voltage into the first contact terminal EC1 when compared to earth ground. Furthermore, resistor R2 is coupled on one end to the floating ground FG and another end to the second electrical contact EC2. As a result, floating ground FG can couple a high voltage into the second contact terminal when compared to earth ground.

Because the voltage potential on electrical contacts EC1 and EC2 may be high when compared to earth ground, it is desirable to protect a user from touching either. The safety switches S1 and S2 provide the measure of safety by opening a circuit when switched opened (i.e. deactivated, turned off or switched off) and closing a circuit when switched closed (i.e. activated, turned on or switched on). In FIG. 24, safety switch S1 essentially opens and closes the circuit between AC spade J1 and its path to floating ground FG. In FIG. 24, safety switch S2 essentially opens and closes the circuit between AC spade J2 and its path to floating ground FG. The opening and closing of switches S1 and/or S2 and their respective circuits, causes the power supply 2402 and the capacitive reactive power supply 2404 and other circuitry to power on and off. Switches S1 and S2 could also be located elsewhere in the circuit such as between the electrical contacts EC1 and node N1 and EC2 and node N2. In this case a third switch is desirable in order to open and close a circuit between the thermistor THM and the contact TM. Switches S1 and S2 could be located intermediately in the circuitry of the power supply 2402, the charger control 2404 and the power supply 2406 if resistor R2 is eliminated and current is sensed differently. In each of these cases, switches S1 and S2 in essence control whether power is provided to electrical contacts EC1 and EC2 or whether power is removed therefrom. Switches S1 and S2 further control whether the contact terminals EC1 and EC2 are isolated from AC power lines or not. When isolated, a user can avoid being shocked.

The first safety switch S1 and the second safety switch S2 are selectively activated (i.e. closed, turned ON or switched ON) and deactivated (i.e. opened, turned OFF or switched OFF) physically in response to respectively closing the charger door into a closed position and opening the charger door into an open position respectively. Safety switches S1 and S2 correspond to the safety switch mechanisms (microswitches 334A–334B and leaf spring switches 234A–234B) previously described. While only one of the safety switches S1 or S2 may be necessary, it is preferable that both are present so that an earth ground pin is not needed and the AC power spades 201 are allowed to be non-polarized and reversible between AC hot and AC neutral while assuring that a user does not become shocked. Additionally with the charger door 210 in a closed position, a user is deterred from touching the electrical contacts EC1 and EC2 when power is supplied to them.

The rechargeable battery pack 100 includes one or more rechargeable batteries RB connected in series together to form a desired potential voltage, a temperature sensor opening TSO, a first battery pack terminal BT1, and a second battery pack terminal BT2. The temperature sensor opening TSO is preferably near a negative terminal of an end rechargeable battery of the rechargeable batteries RB. The first battery pack terminal BT1 is for coupling to first electrical contact EC1 and the second battery pack terminal BT2 is for coupling to the second electrical contact EC2. The first and second electrical contacts EC1 and EC2 correspond to spring contacts 240A and 240B of the spring loaded contact strips 238A and 238B in FIGS. 14–23 of the battery pack charger.

The present invention has many advantages over the prior art. One advantage is that the one or more key slots allow differentiation of the rechargeable battery pack. Another advantage to the present invention is that the rectangular guide tabs provide backward compatibility for the rechargeable battery pack so that it can be charged in former battery chargers as well as be used in former battery operated devices. Another advantage to the present invention is that the rechargeable battery pack has an opening to allow a temperature sensor to probe a rechargeable battery at its terminal casing so that it need not be embedded into the rechargeable battery back and therefore lowers its cost. Another advantage to the present invention is that the one or more key slots and the one or more key tabs provide a safety mechanism to safely charge the appropriate rechargeable battery pack. Another advantage to the present invention is that the spring switch safety mechanism provides a safety system to avoid electrically shocking a user. Another advantage to the present invention is that the rectangular guide tabs in the battery pack charger assures that the appropriate rechargeable battery is inserted in order to be safely charged.

The preferred embodiments of the present invention are thus described. While the present invention has been described in particular embodiments, the present invention should not be construed as limited by such embodiments. The present invention should not be limited to the embodiments disclosed but rather construed according to the claims that follow below.

What is claimed is:

1. A rechargeable battery pack comprising:
a plurality of batteries coupled in series to generate electrical capacity for a battery powered device and to receive a charging current from a charger; and
a battery pack housing to house the plurality of batteries, the battery pack housing having an opening to provide access to a battery case of one of the plurality of batteries, and, a left rectangular guide tab and a right rectangular guide tab to guide the rechargeable battery pack into a battery powered device or a charger.

2. The rechargeable battery pack of claim 1 wherein,
the left rectangular guide tab is the first guide tab near the front of the left side of the rechargeable battery pack and
the right rectangular guide tab is the first guide tab near the front of the right side of the rechargeable battery pack.

3. The rechargeable battery pack of claim 1 wherein,
the left rectangular guide tab slides over a ramp of a charger latch to allow insertion into a charger and engages with a vertical face of the charger latch to lock the rechargeable battery pack in place in the charger.

4. The rechargeable battery pack of claim 3 wherein,
a bottom side of the left rectangular guide tab slides over the ramp of the charger latch and
a rear side of the left rectangular guide tab engages with the vertical face of the charger latch to lock the rechargeable battery pack in place in the charger.

5. The rechargeable battery pack of claim 1 wherein,
the right rectangular guide tab slides over a ramp of a right charger latch and engages with a vertical face of the right charger latch to lock the rechargeable battery pack in place in a charger.

6. The rechargeable battery pack of claim 5 wherein,
a bottom side of the right rectangular guide tab slides over the ramp of the right charger latch and
a rear side of the right rectangular guide tab engages with the vertical face of the right charger latch to lock the rechargeable battery pack in place in the charger.

7. The rechargeable battery pack of claim 5 wherein,
the left rectangular guide tab slides over a ramp of a left charger latch initially at a front edge and engages with a vertical face of the left charger latch to lock the rechargeable battery pack in place in the charger.

8. The rechargeable battery pack of claim 1 wherein,
the opening in the battery pack housing allows a temperature sensor of a charger to thermally couple to the battery case of the one of the plurality of batteries.

9. The rechargeable battery pack of claim 1 wherein,
the battery case is the terminal casing of the one of the plurality of batteries and the opening in the battery pack housing allows a temperature sensor of a charger to mechanically, thermally, and electrically couple to the terminal casing of the one of the plurality of batteries.

10. The rechargeable battery pack of claim 1 wherein,
the left rectangular guide tab and the right rectangular guide tab are respectively on a left side and a right side and nearest a front side of the rechargeable battery pack and the rechargeable battery pack further includes,
a first mirrored-L shaped guide tab on the left side and a first L shaped guide tab on the right side of the battery pack housing.

11. The rechargeable battery pack of claim 10 wherein,
the first mirrored-L shaped guide tab and the first L shaped guide tab are respectively nearest the middle on the left side and the right side of the rechargeable battery pack and
the rechargeable battery pack further includes,
a second mirrored-L shaped guide tab on the left side and a second L shaped guide tab on the right side of the battery pack housing nearest a rear side of the rechargeable battery pack.

12. The rechargeable battery pack of claim 10 wherein,
the first mirrored-L shaped guide tab and the first L shaped guide tab engage with rectangular guide tabs of a charger to hold it in place and stop its forward insertion into the charger.

13. The rechargeable battery pack of claim 1 further comprising:
one or more key tabs to distinguish the rechargeable battery pack.

14. The rechargeable battery pack of claim 1 further comprising:
an edge having one or more key slots to distinguish the rechargeable battery pack.

15. The rechargeable battery pack of claim 1, wherein
the battery pack housing further having a distinguishing feature, the distinguishing feature to distinguish the rechargeable battery pack from others in order to indicate that it has the opening in the battery pack housing to provide access to the battery case of the one of the plurality of batteries.

16. The rechargeable battery pack of claim 1 further comprising:
a surface having one or more key slots to distinguish the rechargeable battery pack.

17. The rechargeable battery pack of claim 14 wherein,
the one or more key slots is an elongated key slot.

18. The rechargeable battery pack of claim 1 wherein,
a first battery of the plurality of batteries coupled in series has a first terminal case with a first terminal at one end,
a second battery of the plurality of batteries coupled in series has a second terminal at an opposite end, and
the opening in the battery pack housing provides access to the first terminal case of the first battery.

19. The rechargeable battery pack of claim 1 further comprising:
a first contact on a right side and a second contact on a left side to couple to a charger to charge the plurality of batteries or to couple to a battery powered device to power it with the plurality of batteries.

20. The rechargeable battery pack of claim 19 wherein,
the battery pack housing has an upper half and a lower half, a front side and a back side and,
the first contact is in the upper half on the right side near the front side and the second contact is in the upper half on the left side near the front side.

21. The rechargeable battery pack of claim 1 wherein,
a first battery of the plurality of batteries coupled in series has a first terminal case with a first terminal at one end,
a second battery of the plurality of batteries coupled in series has a second terminal at an opposite end,
the opening in the battery pack housing provides access to the first terminal case of the first battery, and the rechargeable battery pack further includes,
a first contact on a right side, the first contact coupled to the first terminal of the first battery, and
a second contact on a left side, the second contact coupled to the second terminal of the second battery.

22. The rechargeable battery pack of claim 1 wherein,
the opening is in a front side of the battery pack housing nearer a right side,
the left rectangular guide tab is in a base of a left side of the rechargeable battery pack nearer the front side, and
the right rectangular guide tab is in a base of the right side of the rechargeable battery pack nearer the front side.

23. A rechargeable battery pack comprising:
a plurality of batteries coupled in series to generate electrical capacity for a battery powered device and to receive a charging current from a charger; and
a battery pack housing to house the plurality of batteries, the battery pack housing having
an opening to provide access to a battery case of one of the plurality of batteries,
a left rectangular guide tab and a right rectangular guide tab to guide the rechargeable battery pack into a battery powered device or a charger, the left rectangular guide tab and the right rectangular guide tab are respectively on a left side and a right side and nearest a front side of the rechargeable battery pack,
a first mirrored-L shaped guide tab on the left side and a first L shaped guide tab the right side of the battery pack housing, the first mirrored-L shaped guide tab and the first L shaped guide tab are respectively nearest the middle on the left side and the right side of the rechargeable battery pack, and
a second mirrored-L shaped guide tab on the left side and a second L shaped guide tab on the right side of the battery pack housing nearest a rear side of the rechargeable battery pack,
wherein the left rectangular guide tab and the right rectangular guide tab provide backward compatibility to allow the rechargeable battery back to be charged by former battery pack chargers at a slow charge rate and to operate in a plurality of former battery powered devices.

24. The rechargeable battery pack of claim 23 further comprising:
one or more key tabs to distinguish the rechargeable battery pack.

25. The rechargeable battery pack of claim 23 further comprising:
an edge of the housing having one or more key slots to distinguish the rechargeable battery pack.

26. A method of constructing a rechargeable battery pack, the method comprising:
forming a top half and a bottom half of a battery pack housing, the battery pack housing having
an opening in a front side to allow insertion of a temperature probe, and
a pair of openings on a right and left side to allow protrusion of a pair of contact terminals,
the bottom half having a pair of rectangular guide tabs near a front side on the left and right sides to couple the rechargeable battery pack into a battery pack charger or a battery powered device;
coupling a plurality of rechargeable batteries in series together, a first rechargeable battery of the series having a terminal coupled to one of the pair of contact terminals, a last rechargeable battery of the series having an opposite terminal coupled to the other one of the pair of contact terminals;
inserting the plurality of rechargeable batteries into the battery pack housing so that the terminal casing of the first rechargeable battery of the series is contactable by a temperature probe through the opening in the front side of the battery pack housing and the pair of contact terminals protrude through the pair of openings on the left and right side; and
fusing the top half and the bottom half of the battery pack housing together to hold the plurality of rechargeable batteries coupled in series together within the rechargeable battery pack.

27. The method of claim 26 of constructing a rechargeable battery pack wherein,
the battery pack housing further has
a first L shaped guide tab near a middle of the right side and
a first mirrored-L shaped guide tab near a middle of the left side.

28. The method of claim 27 of constructing a rechargeable battery pack wherein,
the battery pack housing further has
a second L shaped guide tab near a near side on the right side and
a second mirrored-L shaped guide tab near the rear side on the left side.

29. The method of claim 26 of constructing a rechargeable battery pack wherein,
the battery pack housing further has
one or more key slots in a top rear edge to differentiate the rechargeable battery pack as being safe for fast charging by a battery pack charger.

30. The method of claim 29 of constructing a rechargeable battery pack wherein,
the one or more key slots is an elongated key slot in the top rear edge.

31. A method of constructing a rechargeable battery pack comprising:
forming a top half and a bottom half of a battery pack housing, the battery pack housing having
an opening in a front side to allow insertion of a temperature probe, and
a pair of openings on a right and left side to allow protrusion of a pair of contact terminals,
the bottom half having a pair of rectangular guide tabs near a front side on the left and right sides to couple the rechargeable battery pack into a battery pack charger or a battery powered device; coupling a plurality of rechargeable batteries in series together, a first rechargeable battery of the series having a terminal coupled to one of the pair of contact terminals, a last rechargeable battery of the series having an opposite terminal coupled to the other one of the pair of contact terminals;
inserting the plurality of rechargeable batteries into the battery pack housing so that the terminal casing of the first rechargeable battery of the series is contactable by a temperature probe through the opening in the front side of the battery pack housing and the pair of contact terminals protrude through the pair of openings on the left and right side; and fusing the top half and the bottom half of the battery pack housing together to hold the plurality of rechargeable batteries coupled in series together within the rechargeable battery pack,
wherein the battery pack housing provides backward compatibility by coupling to former battery pack chargers and former battery powered devices.

32. The method of claim 31 of constructing a rechargeable battery pack, wherein
the battery pack housing further has
one or more key slots in an edge to differentiate the rechargeable battery pack as being safe for fast charging by a battery pack charger.

33. The method of claim 31 of constructing a rechargeable battery pack, wherein
the battery pack housing further has
one or more key tabs extending from an edge to differentiate the rechargeable battery pack as being safe for fast charging by a battery pack charger.

34. A rechargeable battery pack comprising:
a plurality of batteries coupled in series to generate electrical capacity for a battery powered device and to receive a charging current from a charger;
a top half case and a bottom half case coupled together to form a battery pack housing around the plurality of batteries, the top half case including
one or more key slots configured to distinguish the rechargeable battery pack from other rechargeable battery packs;
a left rectangular guide tab coupled to a left side of the bottom half case, the left rectangular guide tab to guide the rechargeable battery pack into a battery powered device or a charger; and
a right rectangular guide tab coupled to a right side of the bottom half case, the right rectangular guide tab to guide the rechargeable battery pack into a battery powered device or a charger.

35. The rechargeable battery pack of claim 34 wherein,
the left rectangular guide tab is the first guide tab near the front of the left side of the bottom half case and the right rectangular guide tab is the first guide tab near the front of the right side of the bottom half case.

36. The rechargeable battery pack of claim 34 wherein,
the left rectangular guide tab is configured to slide over a ramp of a left charger latch to allow insertion of the battery pack housing into a charger and
the left rectangular guide tab is configured to engage with a vertical face of the left charger latch to lock the battery pack housing in place in the charger.

37. The rechargeable battery pack of claim 36 wherein,
a bottom side of the left rectangular guide tab is configured to slide over the ramp of the left charger latch and
a rear side of the left rectangular guide tab is configured to engage with the vertical face of the left charger latch to lock the battery pack housing in place in the charger.

38. The rechargeable battery pack of claim 34 wherein,
the right rectangular guide tab is configured to slide over a ramp of a right charger latch to allow insertion of the battery pack housing into a charger and
the right rectangular guide tab is configured to engage with a vertical face of the right charger latch to lock the battery pack housing in place in a charger.

39. The rechargeable battery pack of claim 38 wherein,
a bottom side of the right rectangular guide tab configured to slide over the ramp of the right charger latch and
a rear side of the right rectangular guide tab is configured to engage with the vertical face of the right charger latch to lock the battery pack housing in place in the charger.

40. The rechargeable battery pack of claim 38 wherein,
the left rectangular guide tab is configured to slide over a ramp of a left charger latch initially at a front edge and
the left rectangular guide tab is configured to engage with a vertical face of the left charger latch to lock the battery pack housing in place in the charger.

41. The rechargeable battery pack of claim 34 wherein,
the battery pack housing further has an opening to provide access to a battery case of one of the plurality of batteries.

42. The rechargeable battery pack of claim 41 wherein,
the opening in the battery pack housing is configured to allow a temperature sensor of a charger to thermally couple to a battery case of one of the plurality of batteries to be housed therein.

43. The rechargeable battery pack of claim 41 wherein,
the opening in the battery pack housing is configured to allow a temperature sensor of a charger to mechanically, thermally, and electrically couple to a terminal casing of one of the plurality of batteries to be housed therein.

44. The rechargeable battery pack of claim 34 wherein,
the left rectangular guide tab and the right rectangular guide tab are respectively on a left side and a right side and nearest a front side of the bottom half case and
the battery pack housing further includes,
a first mirrored-L shaped guide tab on the left side and a first L shaped guide tab on the right side of the bottom half case.

45. The rechargeable battery pack of claim 44 wherein,
the first mirrored-L shaped guide tab and first L shaped guide tab are respectively nearest the middle on the left side and the right side of the bottom half case and
the battery pack housing further includes,
a second mirrored-L shaped guide tab on the left side and a second L shaped guide tab on the right side of the bottom half case nearest a rear side of the battery pack housing.

46. The rechargeable battery pack of claim 44 wherein,
the first mirrored-L shaped guide tab and the first L shaped guide tab are configured to engage with rectangular guide tabs of a charger to hold the rechargeable battery pack in place and stop its forward insertion into the charger.

47. The rechargeable battery pack of claim 45 wherein,
the left rectangular guide tab and the right rectangular guide tab are configured to provide backward compatibility
to allow the rechargeable battery back to be charged by former battery pack chargers at a slow charge rate and
to operate in a plurality of former battery powered devices.

48. The rechargeable battery pack of claim 47 wherein,
the opening in the battery pack housing is configured to allow a temperature sensor of a charger to thermally couple to a battery case of one of the plurality of batteries housed therein.

49. The rechargeable battery pack of claim 34 wherein,
a rear edge of the top half case has the one or more key slots configured to distinguish the rechargeable battery pack from other rechargeable battery packs.

50. The rechargeable battery pack of claim 49 wherein,
the rechargeable battery pack has an opening in the battery pack housing configured to provide access to the battery case of the one of the plurality of batteries and
the one or more key slots in the rear edge distinguishes that the rechargeable battery pack has the opening from other rechargeable battery packs that do not have the opening.

51. The rechargeable battery pack of claim 34 wherein,
a rear surface of the top half case has the one or more key slots configured to distinguish the rechargeable battery pack from other rechargeable battery packs.

52. The rechargeable battery pack of claim 51 wherein,
the opening in the battery pack housing is in a front side of the top half case nearer a right side,
the left rectangular guide tab is in a base of a left side of the bottom half case nearer the front side, and
the right rectangular guide tab is in a base of the right side of the bottom half case nearer the front side.

53. The rechargeable battery pack of claim 50 wherein,
the one or more key slots are one or more elongated key slots.

54. The rechargeable battery pack of claim 34 wherein,
the top half case further has a first contact opening on the right side near the front side, the first contact opening configured to receive a first contact, and
the top half case further has a second contact opening on the left side near the front side, the second contact opening configured to receive a second contact.

55. The rechargeable battery pack of claim 54 wherein,
the first contact on the right side is a negative terminal to couple to a negative terminal of a charger or a battery powered device and
the second contact on the left side is a positive terminal to couple to a positive terminal of the charger or the battery powered device.

* * * * *